(12) United States Patent
Ravellette

(10) Patent No.: US 9,970,192 B2
(45) Date of Patent: May 15, 2018

(54) MULTIFUNCTIONAL PANEL SYSTEM AND ATTACHMENT MEANS

(71) Applicant: Bay Design, Inc., Waltham, MA (US)

(72) Inventor: Chad Ravellette, Waltham, MA (US)

( * ) Notice: Subject to any disclaimer, the term of this patent is extended or adjusted under 35 U.S.C. 154(b) by 0 days. days.

(21) Appl. No.: 15/082,666

(22) Filed: Mar. 28, 2016

(65) Prior Publication Data

US 2017/0275873 A1 Sep. 28, 2017

(51) Int. Cl.

| | |
|---|---|
| *E04B 2/00* | (2006.01) |
| *E04B 2/02* | (2006.01) |
| *E04C 2/52* | (2006.01) |
| *E04B 2/18* | (2006.01) |
| *E04C 2/284* | (2006.01) |
| *E04B 1/70* | (2006.01) |
| *E04B 1/94* | (2006.01) |
| *E04H 9/14* | (2006.01) |
| *F24J 2/04* | (2006.01) |

(52) U.S. Cl.
CPC .............. *E04B 2/02* (2013.01); *E04B 1/7038* (2013.01); *E04B 1/7076* (2013.01); *E04B 1/94* (2013.01); *E04B 2/18* (2013.01); *E04C 2/284* (2013.01); *E04C 2/46* (2013.01); *E04C 2/523* (2013.01); *E04C 2/525* (2013.01); *E04H 9/14* (2013.01); *F24J 2/04* (2013.01); *E04B 2002/0202* (2013.01); *E04B 2002/0256* (2013.01)

(58) Field of Classification Search
CPC . E04B 2/02; E04B 1/04; E04B 1/7038; E04B 1/7076; E04B 1/94; E04B 2/18; E04B 2/82; E04B 1/14; E04B 1/76; E04B 2001/742; E04B 2002/0202; E04B 2002/0256; E04B 2001/2481; E04F 13/0866; E04F 13/0861; E04F 13/0875; E04F 13/007; E04F 13/141; E04F 15/082; B32B 3/26; B32B 13/04; B32B 13/12; B32B 3/00; E04C 2/525; E04C 2/523; E04C 2/52; E04C 2/46; E04C 2/34; E04C 2/288; E04C 2/284; E04C 1/41; E04H 9/14; F24J 2/04; E04G 17/00
USPC ................ 52/235, 309.7, 309.12; 442/42, 45
See application file for complete search history.

(56) References Cited

U.S. PATENT DOCUMENTS

| | | | | |
|---|---|---|---|---|
| 4,691,490 | A * | 9/1987 | Leaver ...................... | E04B 1/04 52/293.3 |
| 6,460,301 | B1 * | 10/2002 | McKee ..................... | E04C 2/06 52/235 |
| 8,365,496 | B1 * | 2/2013 | Saebi ...................... | E04B 1/161 52/741.41 |
| 8,863,456 | B2 * | 10/2014 | Nicolson ............... | B05B 7/0433 52/309.12 |
| 8,877,329 | B2 * | 11/2014 | Ciuperca .................. | B32B 7/02 428/213 |

(Continued)

FOREIGN PATENT DOCUMENTS

CA 2788910 A1 * 8/2011 ............. E04B 1/762

*Primary Examiner* — Beth A Stephan
(74) *Attorney, Agent, or Firm* — Bay State IP, LLC

(57) ABSTRACT

The instant system is a panel made of several layers that is a highly decorative, fire resistant, water resistant, sound proof, R valued insulated, light weight, and energy efficient panel. Such layers include: glass fiber reinforced concrete, glass fiber reinforced concrete with alkaline resistant fibers, alkaline resistant hurricane tested scrim mesh, a solar powered radiant tubing, a fire resistant foam that contains a steel reinforcement, and an epoxy adhesive.

19 Claims, 25 Drawing Sheets

(56) References Cited

U.S. PATENT DOCUMENTS

| | | | | |
|---|---|---|---|---|
| 8,966,845 B1* | 3/2015 | Ciuperca | .................. | E04B 1/80 52/309.12 |
| 2001/0000088 A1* | 4/2001 | Yetisener | .................. | E04B 2/94 52/309.12 |
| 2002/0170648 A1* | 11/2002 | Dinkel | ................ | B28B 19/0092 156/44 |
| 2003/0079438 A1* | 5/2003 | Stephens | ............ | B28B 23/0056 52/782.1 |
| 2008/0196336 A1* | 8/2008 | Attebery | .................. | E04C 2/06 52/235 |
| 2010/0000168 A1* | 1/2010 | Weiser | .................. | E04F 13/12 52/235 |
| 2010/0146788 A1* | 6/2010 | Dinkel | ................ | B28B 19/0092 29/897.3 |
| 2012/0167505 A1* | 7/2012 | Krause | ................ | E04F 13/0817 52/302.1 |

\* cited by examiner

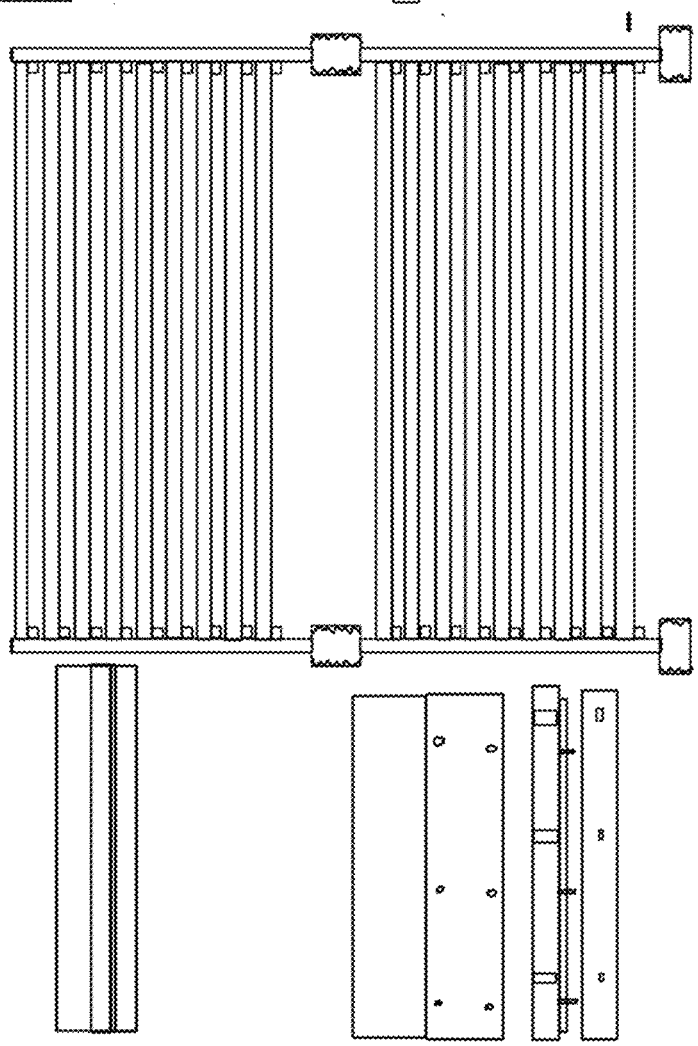

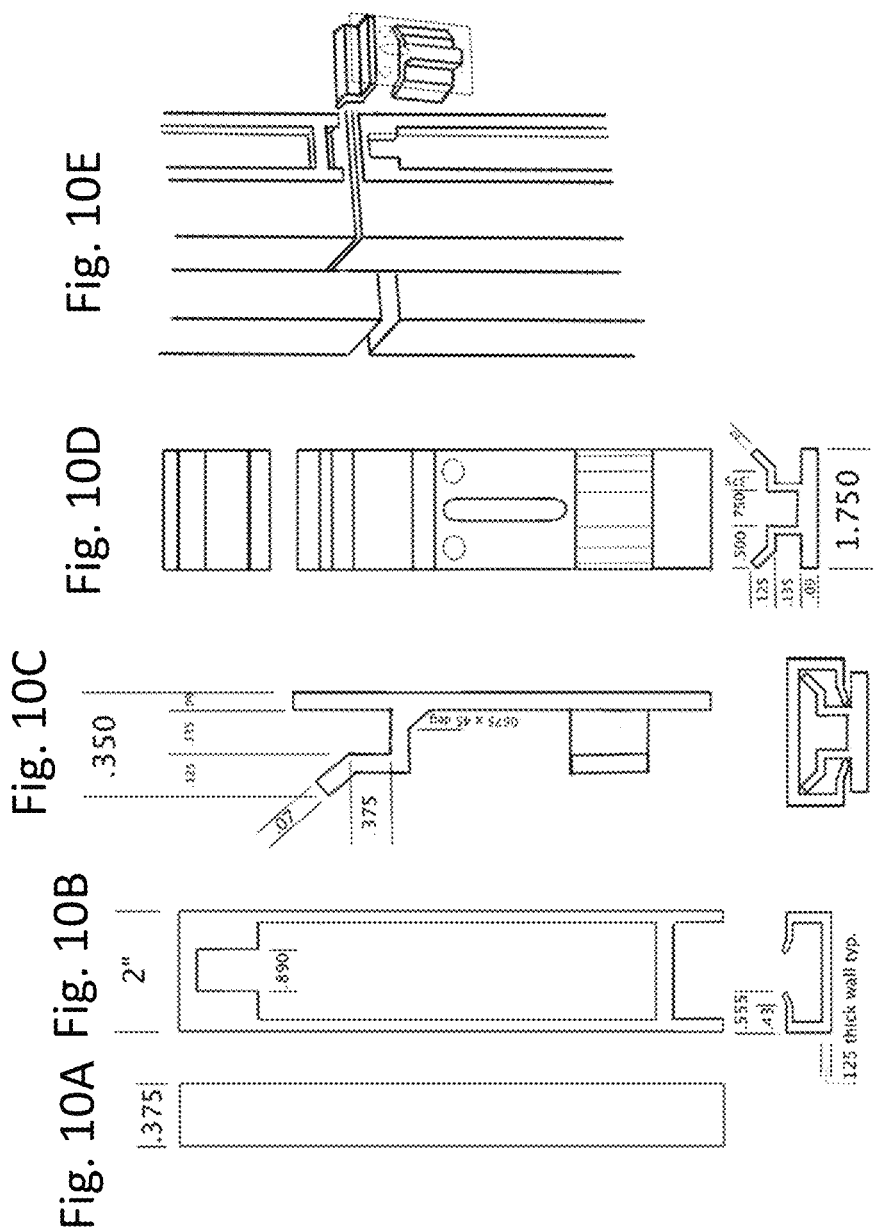

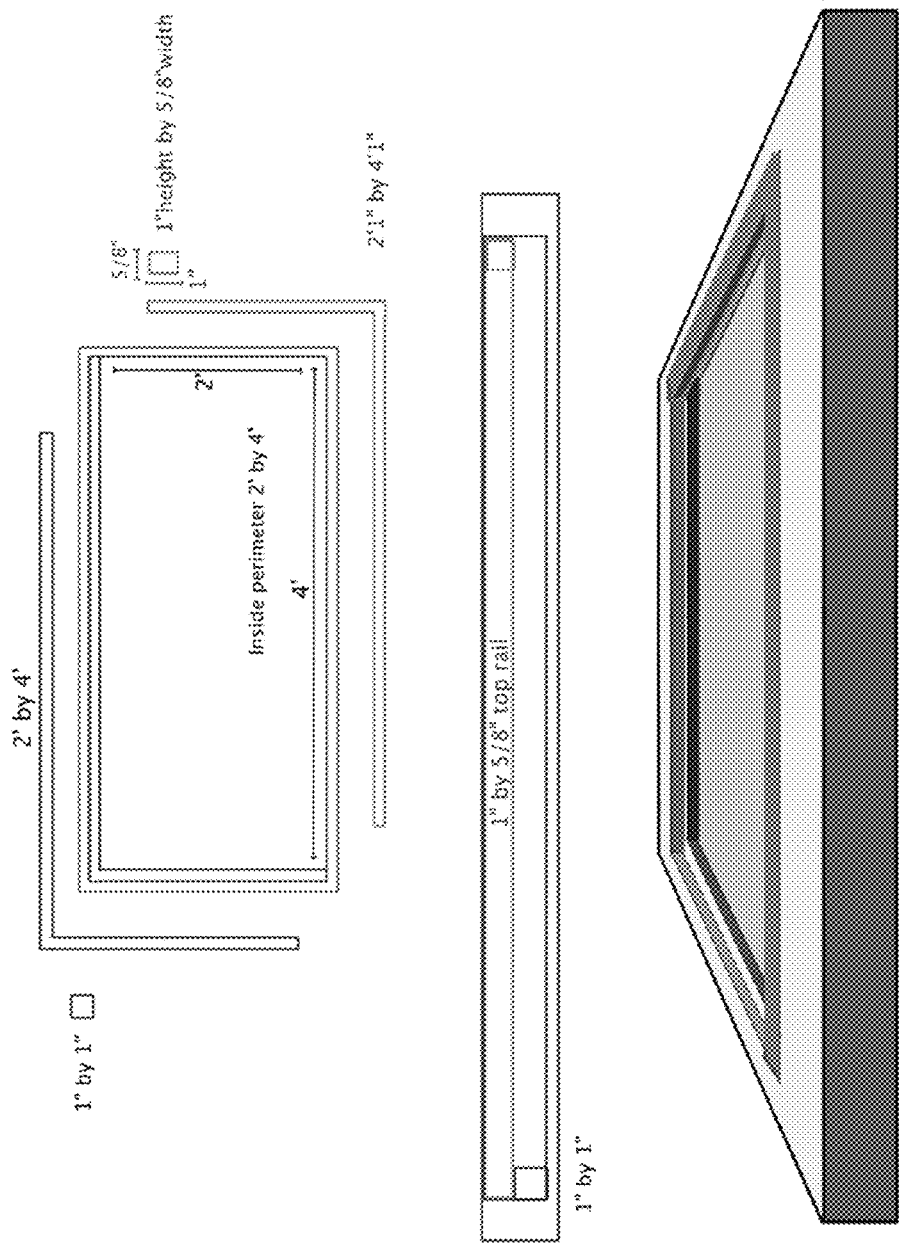

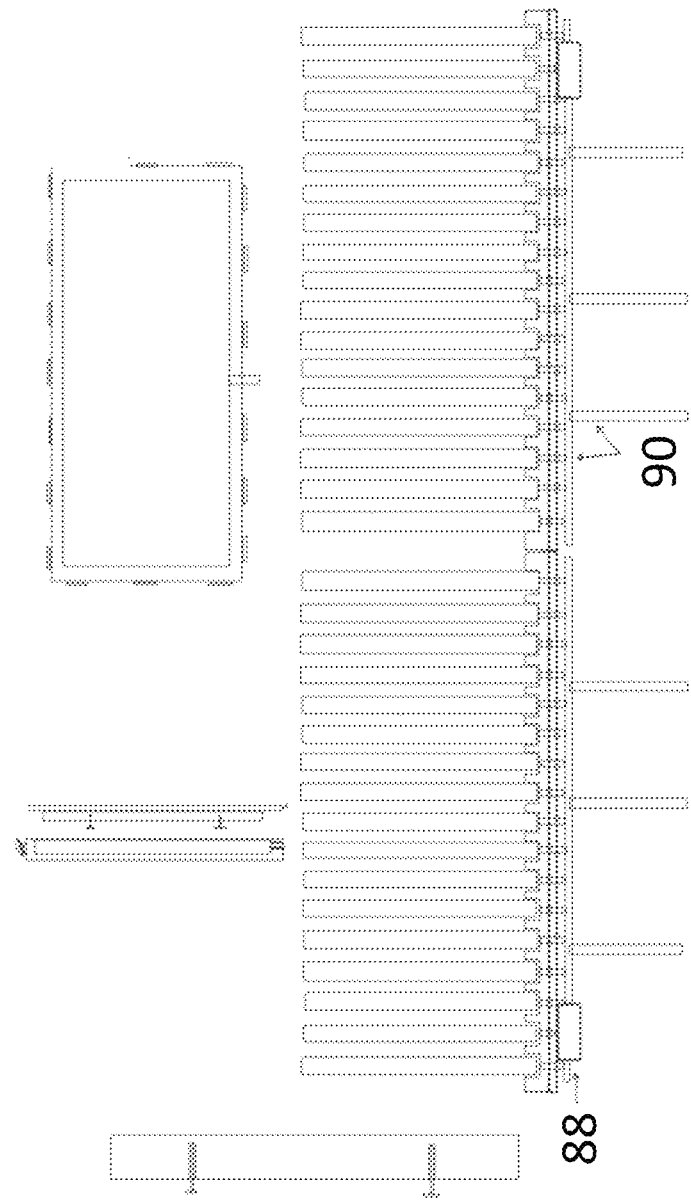

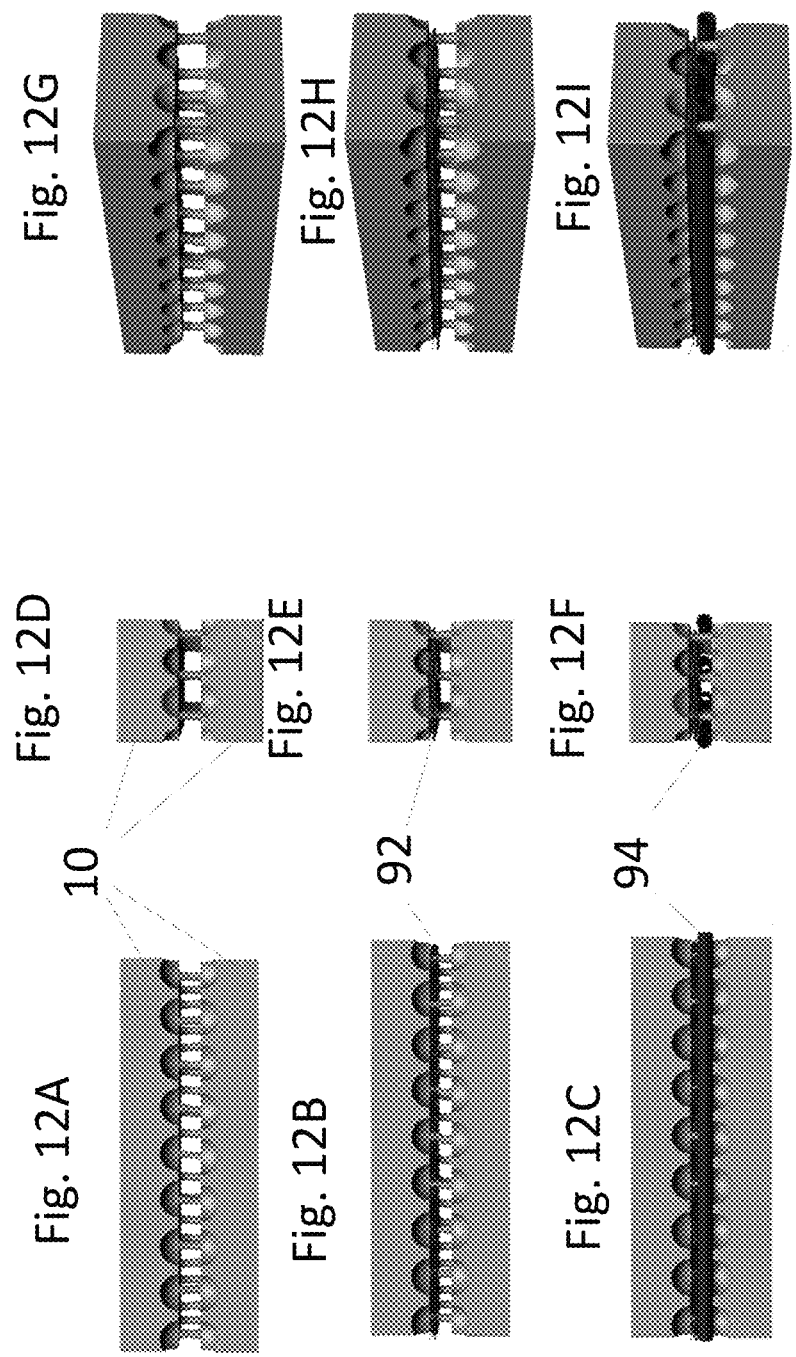

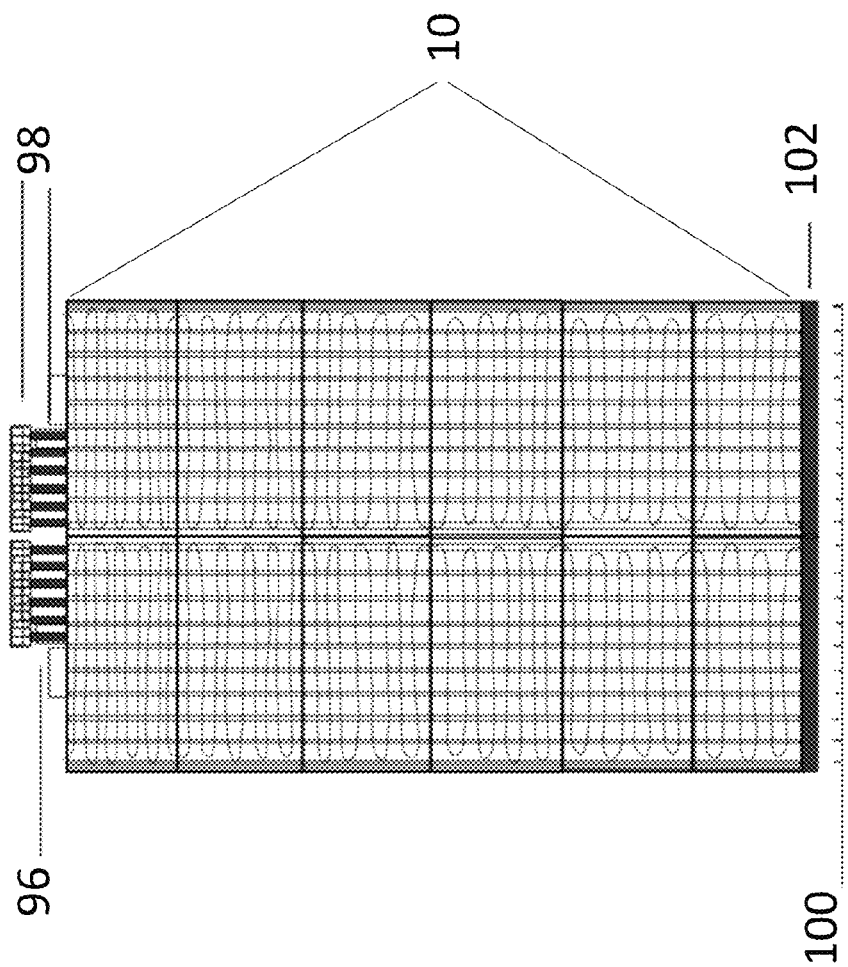

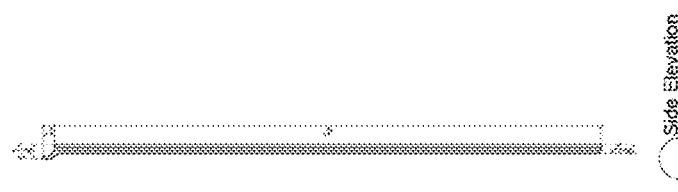
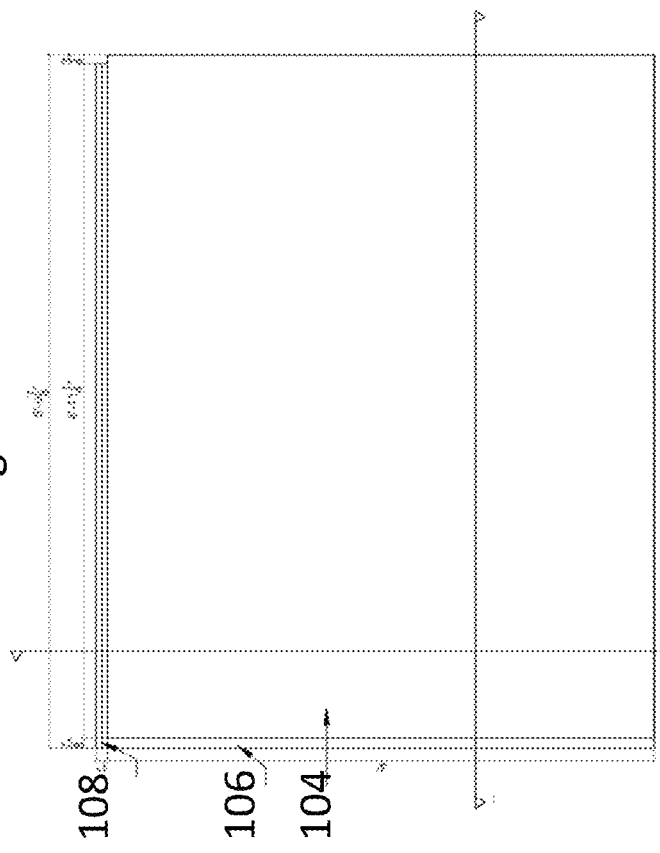
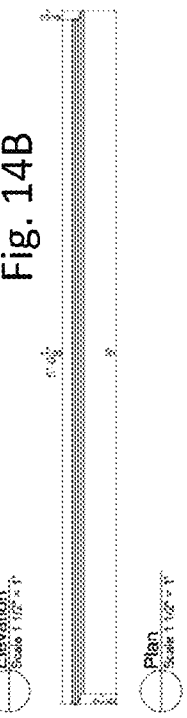

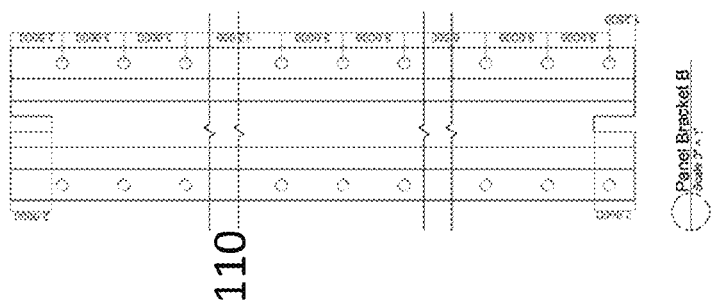
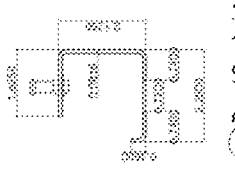
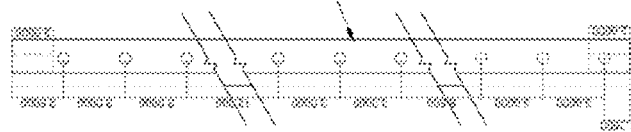

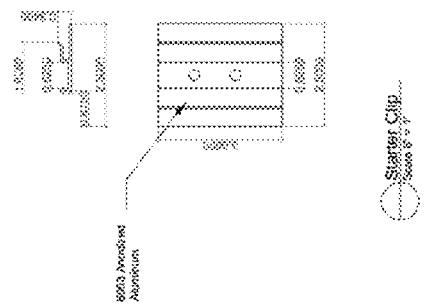
Fig. 18C
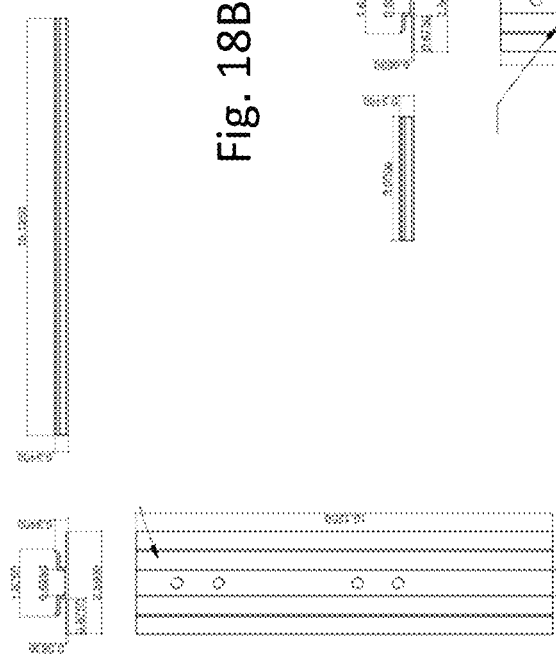
Fig. 18B
Fig. 18A

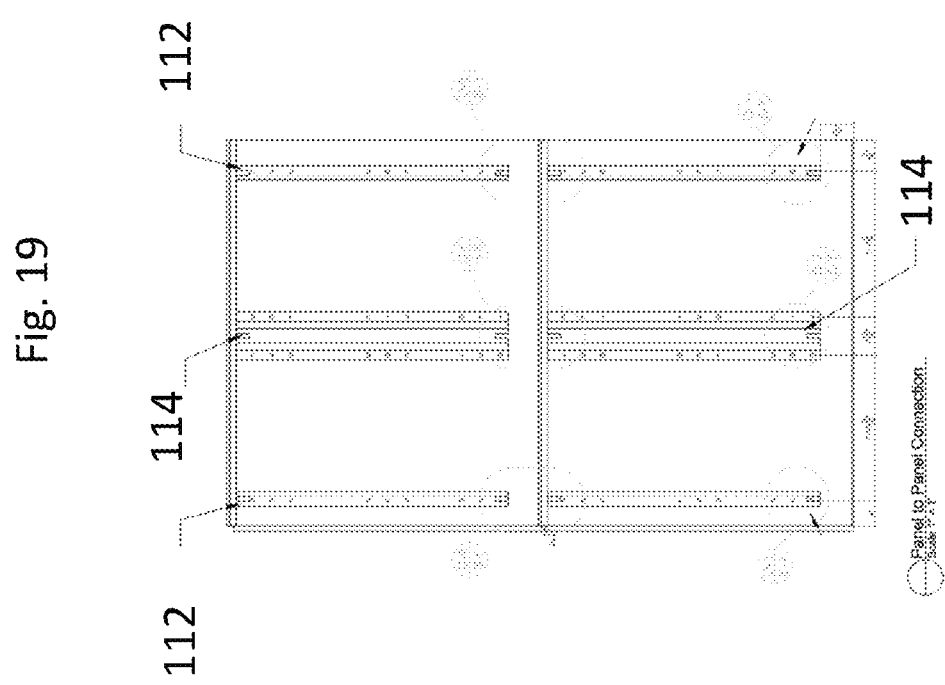

MULTIFUNCTIONAL PANEL SYSTEM AND ATTACHMENT MEANS

CROSS REFERENCE TO RELATED APPLICATION

The instant application takes priority from and claims the benefit of U.S. Provisional Patent Application Ser. No. 62/139,405 filed on Mar. 27, 2015, the contents of which are herein incorporated by reference.

BACKGROUND OF THE INVENTION

Field of the Invention

The present system relates to an energy efficient panel system for exterior and interior walls and ceilings that are fire resistant, water resistant, energy efficient, soundproof and lightweight.

Description of the Related Art

Man has been creating and erecting structures for centuries, and as such, man continues to investigate new manners to decorate structures and while simultaneously incorporating functionality and safety as well.

There are many ways to improve the safety and enjoyment of a structure. Such methods to improve safety include fireproofing and waterproofing. Additional means that can be used to increase the enjoyment of one occupying a structure include soundproofing and making it energy efficient so that it costs less to operate a building.

Furthermore, people enjoy decorating their homes and buildings not only as a form of expression, but also as a way for their building to stand out and possibly attract customers.

The fabrication of natural stone cladding panels and other such edifice enhancement system continue to gain popularity, as well as capability. Concurrently, installation may be affected in numerous manners, some of which feature differing retaining systems and methods. In many of the concurrent facing systems, attachment may typically be completed within a relatively short time frame when high speed attachment methods are utilized. This allows contractors to minimize labor costs and get income-generating new construction or renovation projects to market as fast as possible without sacrificing quality.

Numerous attachment systems operate relatively straightforward compared to the labor intensive approaches used with heavy stone slabs, which typically involve applying mortar and/or grout. One system utilizes a concealed screw attachment method. Within the concealed screw attachment method, there may exist numerous metal plates extending from the rearward side of the natural stone panels. These plates are long enough to enter the joints, and are affixed to the substrate with screws. Backer rods and sealants are then used to conceal any screws in the joint areas. The result is a strong, lightweight, shatter-resistant system that has the appearance of thicker and heavier slab stone.

The concealed screw method of installing certain genres of panels features a number of practical benefits. Specifically the concealed screw method requires fairly basic tools and supplies, is simplified because of the low weights of certain panels, can be completed by glaziers, mill workers, stone setters, and other construction and carpentry professionals, can be completed in the field at any time of the year and in any weather.

Additional installation methods include tab mounted method, clip system, utilization of an adhesive to bond panels directly to the substrate and channel installation for translucent natural stone panels. Many of these methods clip attachment method involve the use of shaped clips and/or shaped moldings. Moldings are mechanically secured to the substrate and clips are attached to the backs of the natural stone cladding panels at the locations indicated in the shop drawings. The panels are then slid into place; the clips fit into the moldings. Finally, structural silicone may be utilized to secure the system.

Setting heavy natural stone slabs into place utilizing materials mortar and grout requires a specialized skill set. Attempting to set in place stone weighing as much as 30 pounds per square foot requires a significant amount of manpower and a high level of manpower is also required for solid stone cladding installation. The clip attachment approach for stone panels that weigh between 2.5 and 3.3 pounds per square foot is comparatively simple. Requiring installation supplies and tools that most construction professionals have at their disposal, the clip installation can usually be completed by carpenters, stone setters, glaziers, mill workers and craftsmen with relevant construction knowledge and experience.

The fabrication of natural stone cladding panels and other such edifice enhancement system continue to gain popularity, as well as capability. Concurrently, installation may be affected in numerous manners, some of which feature differing retaining systems and methods. In many of the concurrent facing systems, attachment may typically be completed within a relatively short time frame when high speed attachment methods are utilized. This allows contractors to minimize labor costs and get income-generating new construction or renovation projects to market as fast as possible without sacrificing quality.

Many of the attachment systems are relatively straightforward compared to the labor intensive approaches used with heavy stone slabs, which typically involve applying mortar and/or grout. One system utilizes a concealed screw attachment method. In the concealed screw attachment method, there are numerous metal plates extending from the backs of the natural stone panels. These plates are long enough to enter the joints, and are affixed to the substrate with screws. Backer rod and sealant are then used to conceal any screws in the joint areas. The result is a strong, lightweight, shatter-resistant system that has the appearance of thicker and heavier slab stone.

The concealed screw method of installing panels features a number of practical benefits. Specifically the concealed screw method requires fairly basic tools and supplies, is simplified because of the low weights of certain panels, can be completed by glaziers, mill workers, stone setters, and other construction and carpentry professionals, can be completed in the field at any time of the year and in any weather. Additional installation methods include tab mounted method, clip system, utilization of an adhesive to bond panels directly to the substrate and channel installation for translucent natural stone panels.

Many of these methods clip attachment method involve the use of shaped clips and/or shaped moldings. Moldings are mechanically secured to the substrate and clips are attached to the backs of the natural stone cladding panels at the locations indicated in the shop drawings. The panels are then slid into place; the clips fit into the moldings. Finally, structural silicone may be utilized to secure the system.

Setting heavy natural stone slabs into place utilizing materials mortar and grout requires a specialized skill set. Attempting to set in place stone weighing as much as 30 pounds per square foot requires a significant amount of manpower and a high level of manpower is also required for solid stone cladding installation. The clip attachment approach for stone panels that weigh between 2.5 and 3.3 pounds per square foot is comparatively simple. Requiring installation supplies and tools that most construction professionals have at their disposal, the clip installation can usually be completed by carpenters, stone setters, glaziers, mill workers and craftsmen with relevant construction knowledge and experience.

SUMMARY OF THE INVENTION

The instant apparatus and system, as illustrated herein, is clearly not anticipated, rendered obvious, or even present in any of the prior art mechanisms, either alone or in any combination thereof. The versatile panel system includes methods and a series of attachment means to mount the panel system with various existing structures. Thus the several embodiments of the instant apparatus are illustrated herein.

Aside from making installation relatively simple and fast, the benefits of the instant system of natural stone cladding panels and attachment thereof are numerous. The instant system may be fabricated using practically any type of natural stone in an array of colors and patterns. Additionally, the system may be enhanced with standard and custom finishes, including polished, honed, and grooved. The instant system also exhibits excellent impact resistance, high flexural strength and will not shatter like natural stone slabs.

In current structure and edifice creation and renovation, often the best material to meet the criteria is concrete. But panels cast to the prescribed larger size in concrete are extremely cumbersome and heavy. Additionally, heavy equipment would be necessary for installation, but such equipment may be deemed too damaging to the environment and thus not allowed at certain the installation sites. Workers needed to transport, manipulate and install the panels by hand. The only material that meet the criteria for appearance, durability and weight is Glass Fiber Reinforced Concrete ("GFRC") panels, and particularly the instant enhanced GFRC based panel system.

In the conception phase, several material and design options for both the panel and the attachment system were considered and tested. Some key characteristics include a composite of materials that must be physically indestructible and additionally withstand weather extremes including high heat, high humidity, hurricane force winds, rain, snow and sleet. The system herein also factors in preservation of the ecological beauty of the area. The overall design, right down to the texture of individual panels, needed to fit into the natural contours of the specific structure or edifice. Minimal impact on the surrounding environment as always is imperative.

Furthermore, design flexibility and weight considerations are major factors as lightweight, durable, GFRC panels, which is a partial portion of the instant system, may provide unlimited diversity in color and form. GFRC panels allow for innovative exterior designs with sculptural shapes. The superior flexibility and lightness of GFRC panels simplify structural framing needs and can reduce foundation costs, especially in areas prone to seismic activity and less-than-ideal soil conditions.

A portion of the instant panel may be created using a cement/aggregate slurry reinforced throughout with resilient, alkali-resistant glass fibers. This GFRC panel portion of the instant system may vary in weight in different embodiments and in one embodiment may weigh from 15 to 25 pounds per square foot depending on surface finish, panel size and shape, and the arrangement of the support steel framework.

Economical, easy and quick to install, fire resistant and energy efficient, the instant panels can be custom designed to exacting specifications. GFRC panels are comprised of a 1" thick composite glass fiber concrete skin that is mechanically attached by flexible steel pins to a sturdy steel frame. GFRC panels are an excellent choice for high-rise buildings in areas of high seismic activity and for very decorative and intricate shapes and applications.

Addressing design advantages, often a custom design can limit how quickly a building is raised. However, with GFRC type systems, designers are afforded maximum design shape flexibility due to the "spray into mold" manufacturing process. GFRC panels also afford designers a wide selection of colors.

Additionally, as GFRC type systems offer flexibility, as well as many other advantages, such systems are often selected over other options because GFRC type systems can be used to create complex panels with intricate details and custom colors with minimal premium cost to the budget compared to competing systems.

And, the ability of building cladding systems to perform successfully depends primarily on their proper design and construction. Current practices in the United States utilize GFRC (Glass Fiber Reinforced Concrete) panels. However, new problems are being detected with such systems. The facade and its attachments (using GFRC) are not being adequately implemented to accommodate vertical and horizontal differential movement between the panels and concrete frame which is resulting in failure or cracking of the panels, and chipping off of the supporting concrete. This differential movement results primarily from extensive GFRC shrinkage and creep, and thermal expansion/contraction of the panels relative to the concrete frame. Thus, there is a need for a system that provides freedom of movement under changing environmental conditions and that establishes sufficient rigidity under gravity, wind, and seismic loads.

The instant system, when utilized in conjunction with proper design and construction capabilities, provides multipurpose and multifaceted options for functional, as well as artistic and esthetically pleasing, metal or composite framed and GFRC-skin covered facades, for freedom of expression in the architectural profile of edifices.

Additionally, the anchoring and attachment mechanisms and systems introduced herein are versatile and thus may be used to support dead loads of the facade itself. It also neutralizes wind loads, and seismic loads by resisting skin bending stresses. Most importantly, the connection is designed to accommodate thermal expansion such that no buckling, opening of sealed joints, excessive stresses in panel components, or other detrimental effects occur. Also, this system offsets initial drying and shrinkage loads, and moisture movements due to change of ambient conditions.

Some of the benefits of the instant system may include a flexibility provision for allowance of volumetric changes in the vertical direction related to changes in moisture (shrinkage) and temperature. Additionally, the system may include a sound structural response against dead, wind, and earthquake loads.

A revolutionary façade system encompassing limitless molding capabilities which comprises a water/vapor ventilation system lodged between the GFRC and insulation allowing both surrounding layers to expand and contract. Furthermore, the system provides a water way for any ambient water retention and vapor retention allowing water vapor to exit through the upper portion and water to weep through the bottom. The water/vapor ventilation system also allows for proper ventilation of the overall system while keeping the insulation dry for maximum R-value.

Additionally, a unique fastening system was introduced which allows the panel to be installed much more quickly, while giving maximum stability and security to the substrate. In one embodiment, a façade paneling system is illustrated and the system may comprise a layer of water and air ventilation material, a layer of mineral wool perimeter flame prevention material, a layer of insulated foam material, a layer of concrete breathable moisture barrier material, a layer of concrete material, and a layer of GFRC fiber reinforced concrete material.

Addressing, Glass fiber reinforced concrete, also known as GFRC or GRC, this material comprises a type of fiber reinforced concrete. Glass fiber concretes are mainly used in exterior building façade panels and as architectural precast concrete. Somewhat similar materials are fiber cement siding and cement boards. Glass fiber reinforced concrete consists of high strength glass fiber embedded in a cementitious matrix. In this form, both fibers and matrix retain their physical and chemical identities, while offering a synergism: a combination of properties that cannot be achieved with either of the components acting alone.

In general, fibers are the principal load-carrying members, while the surrounding matrix keeps them in the desired locations and orientation, acting as a load transfer medium between the fibers and protecting them from environmental damage. In fact, the fibers provide reinforcement for the matrix and other useful functions in fiber-reinforced composite materials. Glass fibers can be incorporated into a matrix either in continuous or discontinuous (chopped) lengths.

The design of glass fiber reinforced concrete panels proceeds from a knowledge of its basic properties under tensile, compressive, bending and shear forces, coupled with estimates of behavior under secondary loading effects such as creep, thermal response and moisture movement. There are a number differences between structural metal and fiber-reinforced composites. For example, metals in general exhibit yielding and plastic deformation, whereas most fiber-reinforced composites are elastic in their tensile stress-strain characteristics.

However, the dissimilar nature of these materials provides mechanisms for high-energy absorption on a microscopic scale comparable to the yielding process. Depending on the type and severity of external loads, a composite laminate may exhibit gradual deterioration in properties but usually does not fail in a catastrophic manner. Mechanisms of damage development and growth in metal and composite structure are also quite different. Other important characteristics of many fiber-reinforced composites are their non-corroding behavior, high damping capacity and low coefficients of thermal expansion.

Glass fiber reinforced concrete architectural panels have the general appearance of pre-cast concrete panels, but differ in several significant ways. For example, the GFRC panels on the average, weigh substantially less than pre-cast concrete panels due to their reduced thickness. Their low weight decreases loads superimposed on the building's structural components. The building frame becomes more economical.

In one embodiment, the system may include a fiberglass grid reinforcement which is bonded with an epoxy resin. Further glass fibers plainly pose no health hazards as AR glass fibers are typically 13 or 14 microns in diameter, and as fibers with diameters greater than 3 microns cannot be inhaled.

In an additional embodiment, a blend of fibers, using glass fibers in combination with polyvinyl alcohol or nylon fibers to control plastic shrinkage cracking.

The instant invention combines all of these desirable features into a layered, lightweight panel system that can be affixed to various types of structures, on the inside or outside of the structure.

The instant invention can come in different colors and shapes to allow for thousands of decoration options and expression. Furthermore, due to the unique layering of unique materials, the instant invention is fire resistant, water resistant, energy efficient, and soundproof.

The typical "flex connectors" documented in the PCI Recommended Practice are carefully detailed to have predictable stiffness and yield behavior. Apparently, they are usually designed on the assumption that they yield under panel shrinkage, eliminating the need for precise shrinkage-compatibility calculations. Your proposed box-style connector seems like it would be relatively rigid. (I'm not sure what the stand-off bracket would be, exactly; may be it flexes.) The rod anchors may be similar to a flex anchor, but the plate fully embedded in the bonding pad probably provides somewhat more restraint.

The instant invention, as illustrated herein, is clearly not anticipated, rendered obvious, or even present in any of the prior art mechanisms, either alone or in any combination thereof. Therefore, it is an object of the instant invention to provide an adhesion to a structured wall to create a highly decorative, fire resistant, water resistant, sound proof, R-valued insulated, light weight, and energy efficient panel.

It is a further object of the instant system to include an outer layer utilizing a glass fiber reinforced concrete coating of varying thickness.

It is a further object of the instant system to include a glass fiber reinforced concrete coating to be made of concrete, sand, water, glass fibers, and SP 7000.

It is a further object of the instant system to utilize an SP 7000 comprising a high-performance aqueous dispersant that is added to concrete because it reduces the water content, which leads to increased productivity, lower costs, and improved concrete properties.

It is a further object of the instant system that there is method for creating and molding the glass fiber reinforced concrete coating. For mixing the coating, add color to Part B and mix thoroughly before adding Part A. Stir both parts together, scraping the sides and bottom while doing so. Then, apply a releasing agent to the mold that will be used. Then pour the liquid into the mold, pouring into the lowest part of the mold. For casting the mold, generally ten minutes at room temperature 73° F. (23° C.)

It is a further object of the instant system for the glass fiber reinforced concrete coating to have a flame spread index of zero and less than five smoke density.

It is a further object of the instant system to include a second layer of glass fiber reinforced concrete with reinforced alkaline resistant fibers. Start here It is a further object of the instant system for the third layer of the instant system to be an alkaline resistant hurricane tested scrim mesh.

It is a further object of the instant system for the alkaline resistant hurricane tested scrim mesh layer to be contained within the glass fiber reinforced concrete with reinforced alkaline resistant fibers.

It is a further object of the instant system for the alkaline resistant hurricane tested scrim mesh layer to be a structured form of glass fiber reinforcement in which the strands are laid in vertical and horizontal parallel lines forming a grid. The scrims are not woven, but laid over each other and adhesive is used to bond the scrims together so that the scrim keeps it integrity. The mesh is in between the strands.

The skrims must possess an opening of at least 0.25 inches because concrete and sand mixes have relatively coarse particle sizes, there has to be sufficient open area in the scrim construction to allow the matrix to freely penetrate it and allow full wet-out of the fibers, without causing separation of the solids and the water. Scrims are used because they offer a more efficient reinforcement than is obtained from randomly dispersed chopped strands.

It is a further object of the instant system for the fourth layer of the instant system to comprise solar powered radiant tubing.

It is a further object of the instant system for the fifth layer of the instant system to comprise a fire resistant foam material or other such material which is state of the art in the industry.

It is a further object of the instant system that there is a method for creating and molding the fire resistant foam. In one embodiment, a mixture of at least two parts may be utilized. In one method, the user may pre-mix Part B after measuring out the materials for the best results, and then mix Part A and Part B for at least thirty seconds, using a mechanical mixer for the best results. Then, pour the mixture into the mold at the lowest part of the mold, making sure to leave room in the mold for the expansion of the foam. Let the foam stand for thirty minutes before handling.

It is a further object of the instant system for the layer of fire resistant foam to contain a steel reinforcement for added stability.

It is a further object of the instant system for the inner most layer to be an epoxy adhesive to attaching the instant system to the surface of a structure.

It is a further object of the instant system for the instant system to have an interlocking system so that the panels can be interlocked together then adhered to a structure.

It is a further object of the instant system for the panel to include a varying R-value for increased insulation.

The R-value is a measure of thermal resistance used in the building and construction industry. Under uniform conditions it is the ratio of the temperature difference across an insulator and the heat flux (heat transfer per unit area per unit time, $\dot{Q}_A$) through it or $R=\Delta T/\dot{Q}_A$. Thermal resistance varies with temperature but it is common practice in construction to treat it as a constant value.

An R-value is a unit thermal resistance for a particular material or assembly of materials (such as an insulation panel). The R-value depends on a solid material's resistance to conductive heat transfer. For loose or porous material, the R-value accounts for convective and radiative heat transfer through the material. However it does not account for the radiative or convective properties of the material's surface, which may be an important factor for some applications.

There are many factors that come into play when using R-values to compute heat loss for a particular wall. Manufacturer R values apply only to properly installed insulation. Squashing two layers of batting into the thickness intended for one layer will increase but not double the R-value. (In other words, compressing a fiberglass batt decreases the R-value of the batt but increases the R-value per inch.) Another important factor to consider is that studs and windows provide a parallel heat conduction path that is unaffected by the insulation's R-value.

The practical implication of this is that one could double the R-value of insulation installed between framing members and realize substantially less than a 50% reduction in heat loss. When installed between wall studs, even perfect wall insulation only eliminates conduction through the insulation but leaves unaffected the conductive heat loss through such materials as glass windows and studs. Insulation installed between the studs may reduce, but usually does not eliminate, heat losses due to air leakage through the building envelope. Installing a continuous layer of rigid foam insulation on the exterior side of the wall sheathing will interrupt thermal bridging through the studs while also reducing the rate of air leakage.

It is a further object of the instant system for there to be an alternative embodiment of the instant system to include a Z-clip hanging system.

It is a further object of the alternative embodiment of the instant system for the back of the panel to have horizontal and vertical supports.

It is a further object of the alternative embodiment of the instant system to have Z-clips affixed to the top and bottom of the vertical support.

It is a further object of the alternative embodiment of the instant system to have the Z-clips append to a Z rail to secure the panels and prevent them from moving from sideways.

In this respect, it is to be understood that the system is not limited in its application to the details of construction and to the arrangements of the components set forth in the following description or illustrated in the drawings. The system is capable of other embodiments and of being practiced and carried out in various ways. Also, it is to be understood that the phraseology and terminology employed herein are for the purpose of description and should not be regarded as limiting.

These together with other objects of the system, along with the various features of novelty, which characterize the system, are pointed out with particularity in the claims annexed to and forming a part of this disclosure. For a better understanding of the system, its operating advantages and the specific objects attained by its uses, reference should be made to the accompanying drawings and descriptive matter in which there are illustrated preferred embodiments of the system.

BRIEF DESCRIPTION OF THE DRAWINGS

FIGS. 9A-9C illustrate yet another embodiment of an attachment system to secure the panel system to an existing structure or wall.

FIGS. 10A-10E illustrate yet another embodiment of an attachment system to secure the panel system to an existing structure or wall.

FIGS. 11A-11C illustrate various embodiments of a jig system for use with the panel system.

FIGS. 12A-1I and FIG. 13 illustrate a rain water thermal heating and cooling system utilizing the panel system.

FIGS. 14A-14C illustrate various viewpoints of one embodiment of an individual panel of the panel system.

FIGS. 17A-17D illustrate a variety of brackets utilized to secure various components of the panel.

FIGS. 18A-18C illustrate a variety of clips that may be utilized with the brackets.

FIG. 19 illustrates a perspective view of the back of the panel, wherein a plurality of lateral brackets and seismic brackets may be utilized during panel to panel construction.

DETAILED DESCRIPTION OF THE SEVERAL EMBODIMENTS

The detailed description set forth below is intended as a description of presently preferred embodiments of the system and does not represent the only forms in which the present system may be construed and/or utilized. The description sets forth the functions and the sequence of the steps for producing the system and accompanying apparatus. However, it is to be understood that the same or equivalent functions and sequences may be accomplished by different embodiments also intended to be encompassed within the scope of the system.

Figure 1:
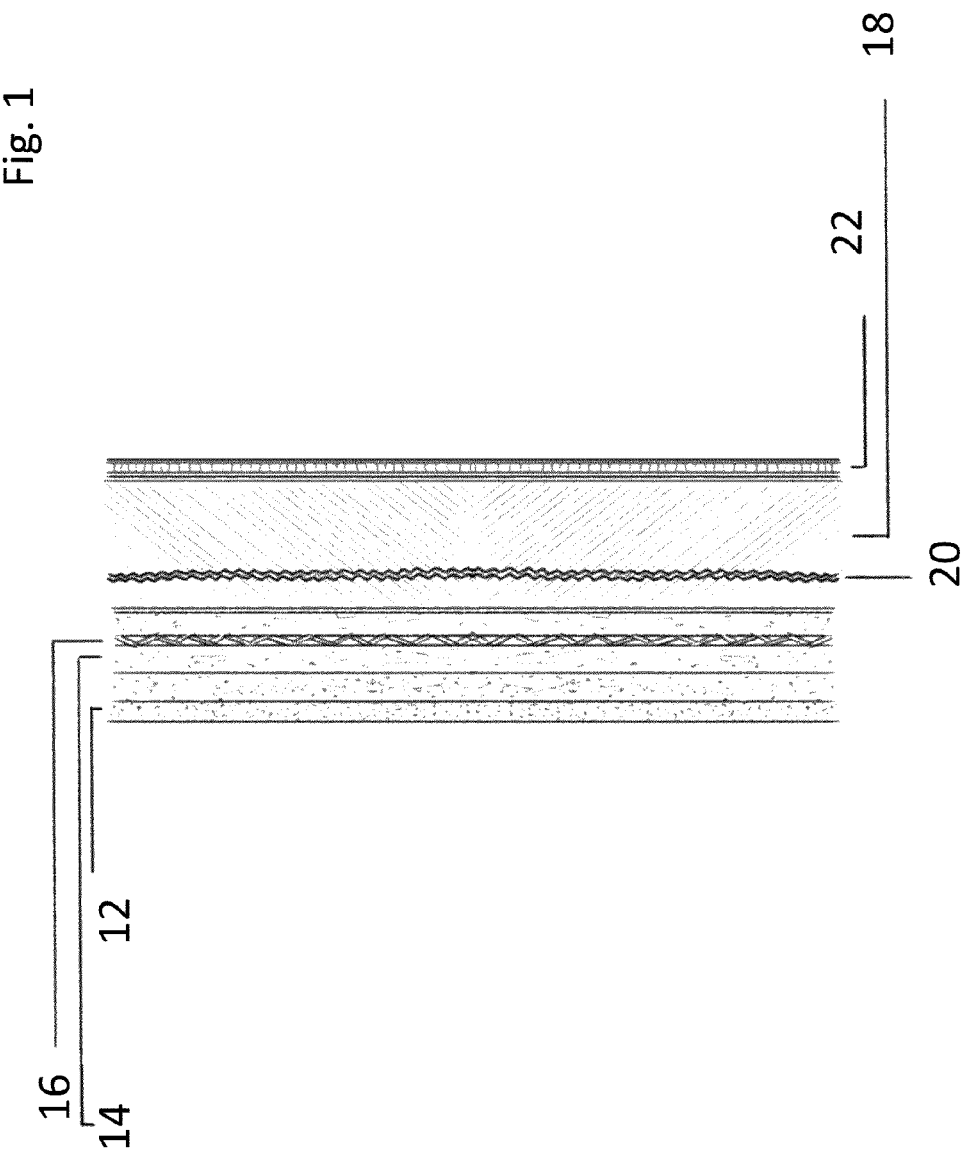
FIG. 1 illustrates a cross-sectional side view of one embodiment of an individual panel of the panel system displaying the various interconnected layers that form each panel.

FIG. 1 illustrates a cross-sectional view of one embodiment of a panel 10, wherein the panel preferably is comprised of multiple layers. In one embodiment, the panel 10 comprises a first layer 12, wherein the first layer 12 is considered to be the outermost layer of the panel 10 in relation to an innermost layer of the panel 10 which would be affixed to an existing structure.

Preferably, the first layer 12 may be comprised of a glass fiber reinforced concrete coating ("GFRC"). Normally, the GFRC "face coat" is constructed of a mixture of concrete, sand, water, glass fibers, and SP 7000. In practice, SP 7000 is a high-performance aqueous dispersant that is added to concrete because it reduces the water content, which leads to increased productivity, lower costs, and improved concrete properties.

In alternative embodiments the GFRC first layer 12 may comprise a flame spread index of zero and a less than five smoke density. A second layer 14 comprised of a plurality of glass fiber reinforced concrete coats with reinforced alkaline resistant fibers is placed against one side of the first layer 12. Additionally, a third layer 16 of the panel comprises an alkaline resistant hurricane tested skrim mesh, wherein the third layer is situated and contained within the plurality of the glass fiber reinforced concrete coats that make up the second layer 14 of each panel 10.

In one embodiment, the skrim mesh of the third layer 16 of the panel 10, may comprise a structured form of glass fiber reinforcement in which the strands are laid in vertical and horizontal parallel lines forming a grid. The skrims preferably are not woven, but laid over each other, and where adhesive is used to bond the skrims together so that the skrim keeps it integrity. In another embodiment, the mesh is located in-between the strands. Additionally, the scrims should preferably have an opening of at least one-quarter inch since concrete and sand mixtures have relatively coarse particle sizes. In this scenarios, there has to be sufficient open area in the skrim construction to allow the matrix to freely penetrate it and allow full wet-out of the fibers, without causing separation of the solids and the water.

In most instances skrims are utilized because they offer a more efficient reinforcement than is obtained from randomly dispersed chopped strands.

A fourth layer 18 of the panel may comprise a fire resistant foam, which is low density and therefore lightweight. The layer of fire resistant foam 18 further comprises a steel reinforcement 20 to provide added stability and strength.

A fifth layer 22, which also be considered the "innermost" layer of the panel 10 comprises an epoxy adhesive for attaching each panel 10 to a surface of an existing structure or exterior wall.

Figure 2:
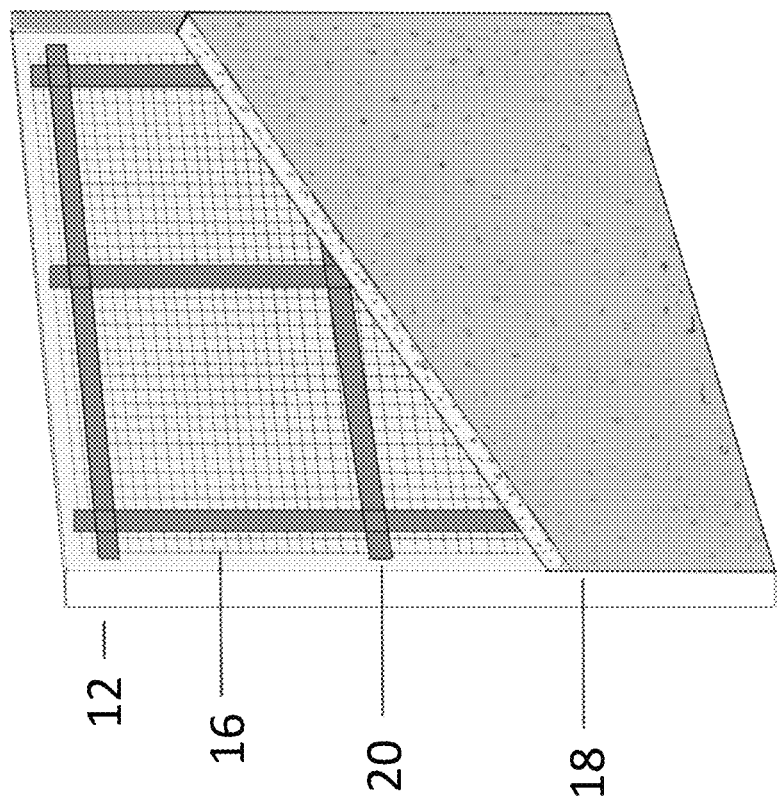
FIG. 2 illustrates a front-facing cut-away view of one embodiment of an individual panel of the panel system.

FIG. 2 illustrates a cut-away view of one embodiment of the panel 10. In this view, the fire resistant foam layer 18 is shown encompassing the third layer 16 comprising the skrim mesh and the steel reinforcement 20 contained within the fire resistant foam layer 18.

Figure 3:
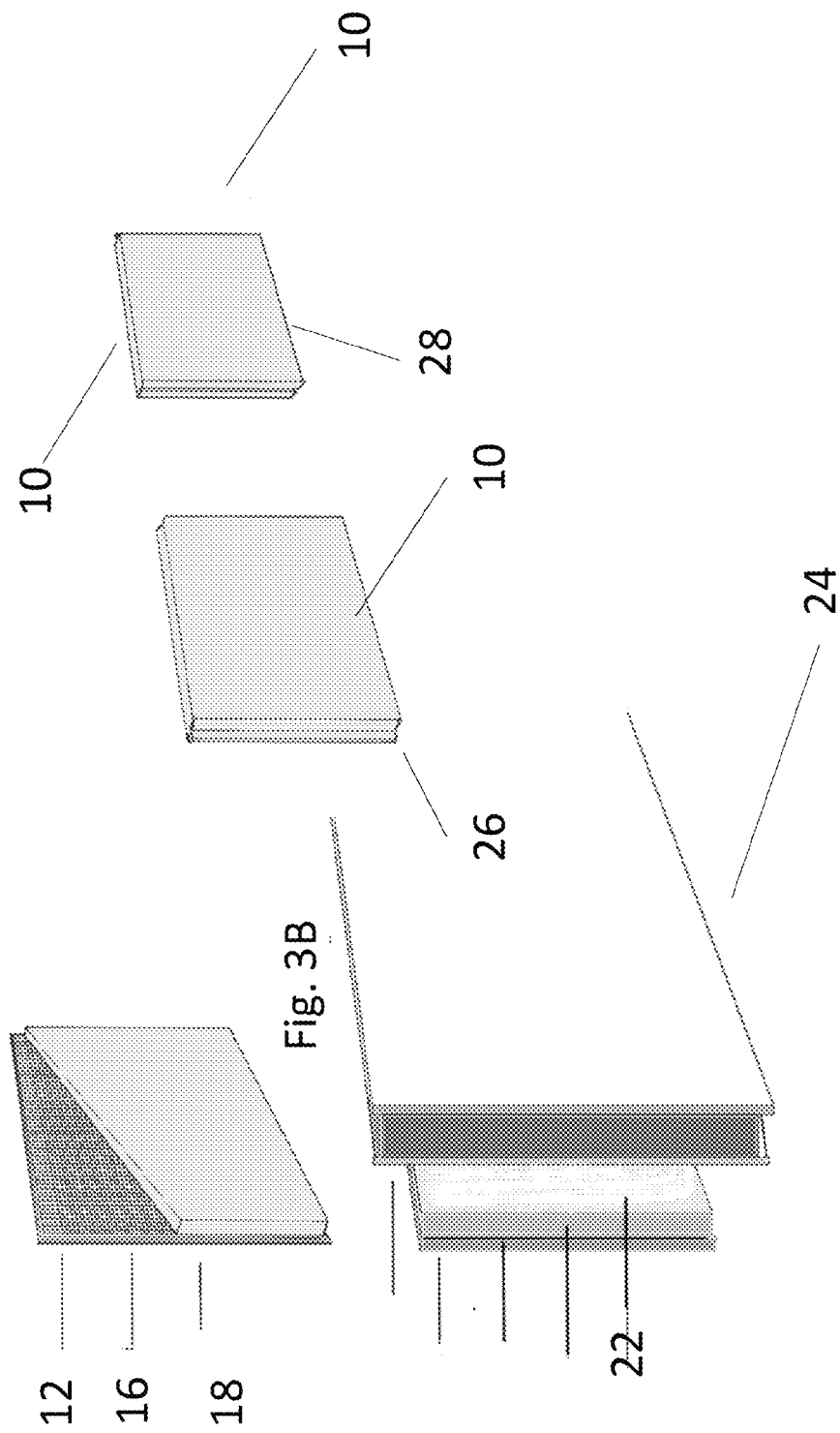
FIG. 3A illustrates a cut-away view of one embodiment of a panel configuration of the panel system.
FIG. 3B illustrates a perspective view of one embodiment of the adhering process of a panel to an existing structure or wall.
FIG. 3C illustrates one embodiment of an interlocking system for multiple panels prior to adhering to an existing structure.
Figure 4:
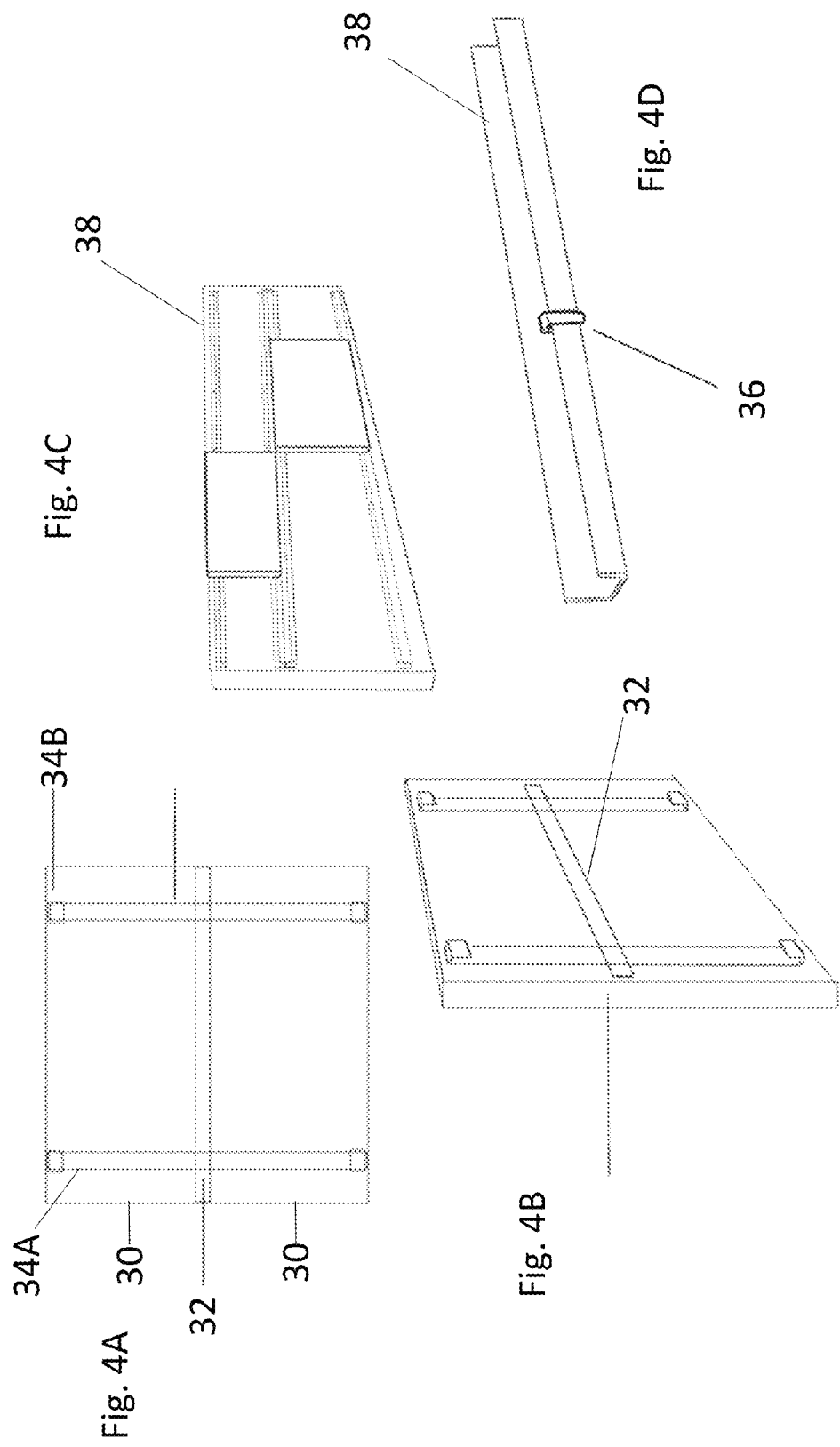
FIGS. 4A-4D illustrate various views of one embodiment of a z-clip attachment system to secure each panel to an existing structure.

FIG. 3A illustrates a cut-away view of one embodiment of a panel configuration of the panel system. Again, similar to the view shown in FIG. 2, the GFRC 12 is the outermost layer and contained within is the skrims of the third layer 16 and the fourth layer 18 comprising the fire resistant foam.

FIG. 3B illustrates a perspective view of one embodiment of the adhering process of the panel 10 to an existing structure or wall 24. In this embodiment, and as described earlier, the innermost layer of each panel 10 comprises an epoxy adhesive 22 or other similar bonding agent to secure the panel 10 to the existing structure 24 for use.

FIG. 3C illustrates one embodiment of an interlocking system for multiple panels 10 prior to adhering to an existing structure. In this embodiment, the panel 10 may be interlocked together and then adhered via the epoxy adhesive 22 to the existing structure 24. Each panel 10 in several embodiments may further comprise a protrusion 26, which can also be an extension, and a cavity 28, which can also be a grove or a channel. The protrusion 26 of one panel 10 preferably interlocks with the cavity 28 of another panel 10 to create a line of linked panels 10.

FIGS. 4A-4D illustrate various views of one embodiment of a z-clip attachment system 30 to secure each panel 10 to an existing structure 24. The z-clip attachment system 30 is an alternative method to secure each panel 10 to the existing structure 24 versus the epoxy adhesive of the fifth layer 22. In this alternative embodiment each panel 10 comprises a horizontal support 32 that runs along the back of the panel 10 or the innermost layer; in this case since the epoxy is not present, the innermost layer would be the fire resistant foam layer 18. Additionally, the back (innermost layer) of the panel 10 also includes two vertical supports 34A-343, which run vertically along the sides of the back of the panel 10. The vertical supports 34A-343 cross over the horizontal support 32 preferably at or around a ninety degree angle. Additionally, a z rail secure clip 36 may be provided as part of the z-clip attachment system 30 to secure each panel 10 from moving side to side once secured to the existing structure 24.

The vertical supports 34A-34B may have Z-clips 36 affixed to the top and bottom of each of the vertical supports 34A-34B. The Z-clips 36 are preferably U-shaped so that the clips 36 on the top of the vertical supports 34A-34B have their opening facing down and the clips 36 have their opening facing the top. The Z-clips 36 are affixed to a Z-rail 38 to secure the panels and prevent them from moving and sliding sideways. The top Z-clips 36 attach to the top Z-rail 38 and the bottom Z-clips 36 attach to the bottom Z-rail 38.

Figure 5:
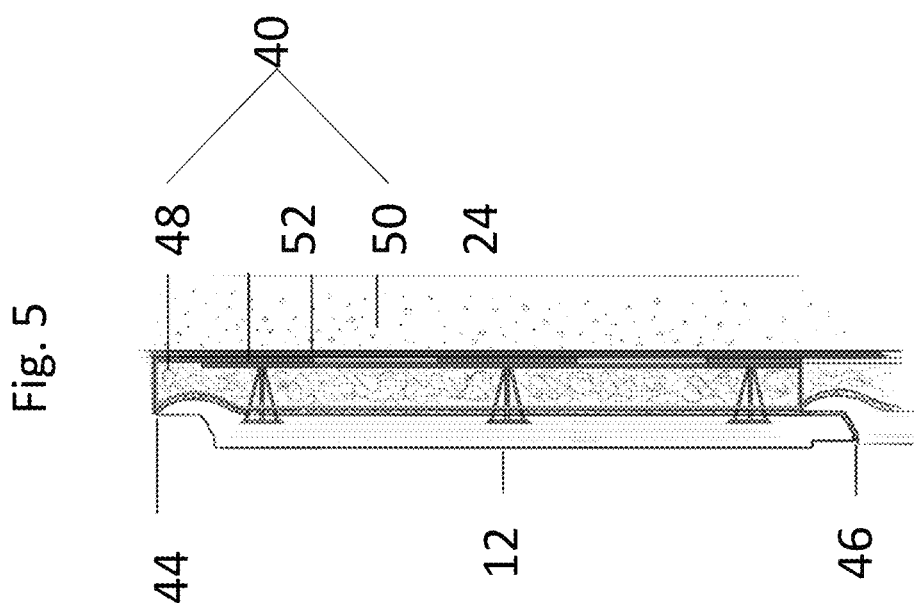
FIG. 5 illustrates one embodiment of an attachment system to secure the panel system to an existing structure or wall.

FIG. 5 illustrates one embodiment of an attachment system to secure the panel system to an existing structure or wall. In this embodiment, the panel system incorporates a water/air vapor ventilation system 40 located between the GFRC 12 and an insulation layer 42 to allow each panel 10 to expand and contract. Additionally, the ventilation system 40 also works as a water way for any water retention and vapors thus allowing both water vapors to exit through the top and water to weep at the bottom. Furthermore, the ventilation system allows for proper ventilation of an insulation layer, keeping the insulation dry for a maximum R-value.

In one embodiment, a water condensation ventilation mat 44 is located near the top of each panel 10, and a controlled water/air vapor ventilation 46 is situated between the GFRC 12 and a mineral wool insulation 48. Furthermore, a moisture barrier 50 is located against the mineral insulation 48 as the innermost layer of the panel 10 and against the existing structure 24. Additionally, a plurality of A & B fasteners 52 with five post weight distribution is located along the panel 10 to secure the panel 10 to the existing structure 24.

Figure 6:
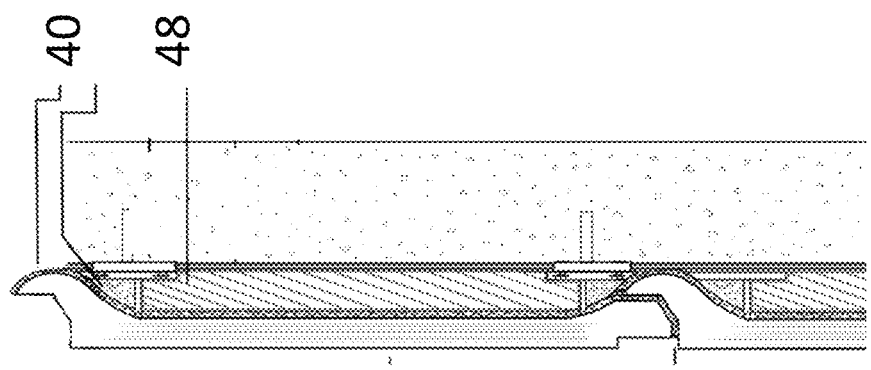
FIG. 6 illustrates another embodiment of an attachment system to secure the panel system to an existing structure or wall.

FIG. 6 illustrates another embodiment of the ventilation system 40 to allow each panel 10 to expand and/or contract following installation to an existing structure 24.

Figure 7A:
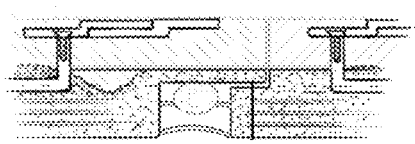
FIGS. 7A-7B illustrates yet another embodiment of an attachment system to secure the panel system to an existing structure or wall.
Figure 7B:
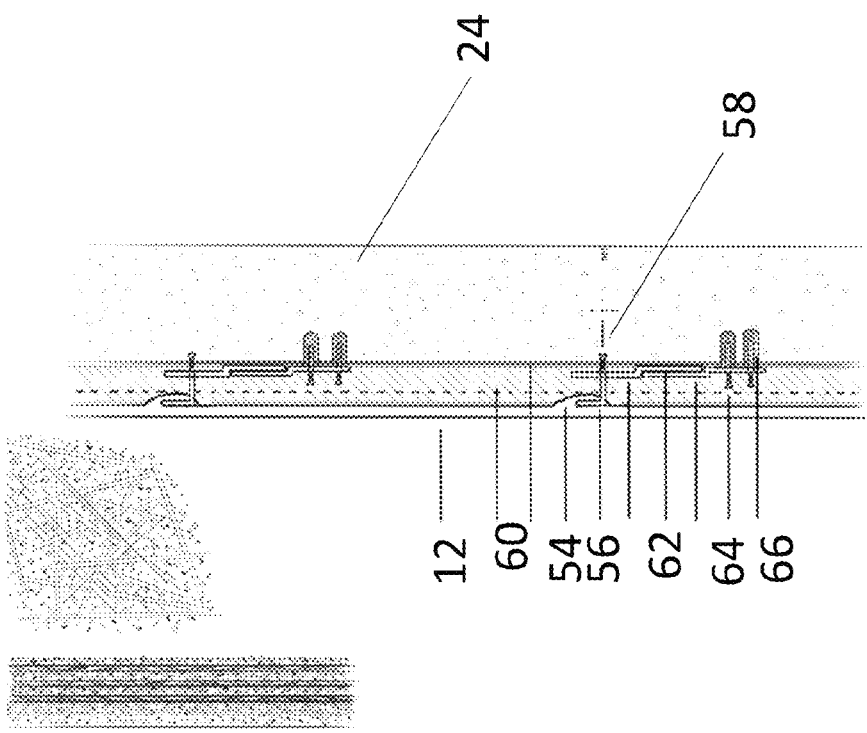

FIGS. 7A-7B illustrates yet another embodiment of an attachment system to secure the panel system to an existing structure or wall. In this embodiment, the GFRC 12 is the outermost layer of the panel 10 and is placed against a flex rod bonding pad 54 that includes a flex rod 56 connected to a z-channel fastener 58. The flex rod bonding pad 54 is secured against a polyurethane foam/air vapor barrier 60 which is position against the existing structure 24.

Furthermore, a z-channel connection 62 is connected to the flex rod 56 by the z-channel fastener 58 and secures the panel 10 to the existing structure 24 by a z-channel anchoring hardware 64 and anchoring epoxy 66. In alternate embodiments, a plurality of z-channel anchoring hardware 64 and flex rods 56 are positioned along the panel 10 to secure to the existing structure 24.

Figure 8:
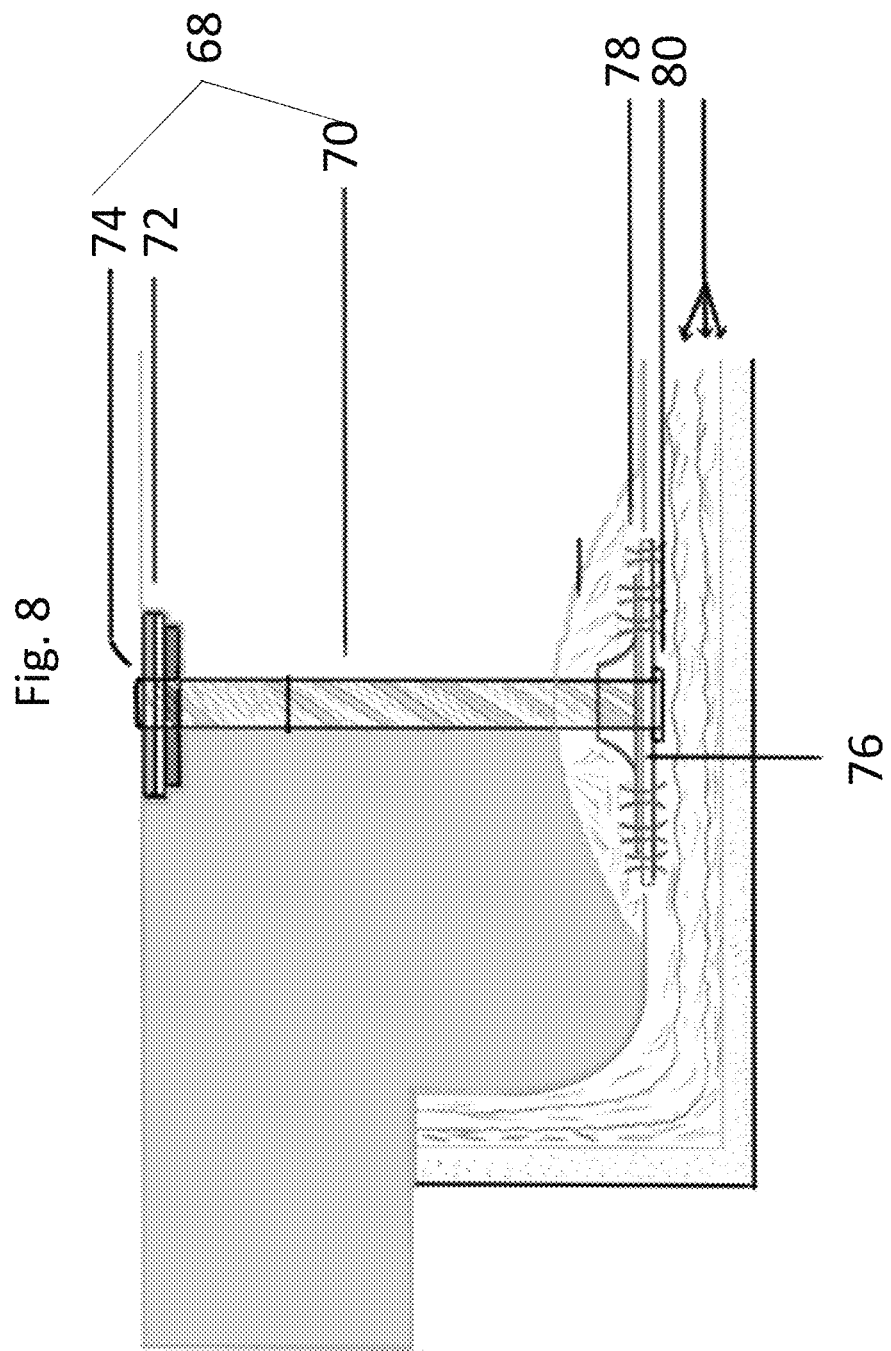
FIG. 8 illustrates one embodiment of a fastening rod for use with a panel for the purposes of securing the panel to an existing structure or wall.

FIG. 8 illustrates one embodiment of a fastening rod for use with a panel for the purposes of securing the panel to an existing structure or wall. In this embodiment a fastening rod 68 comprises flex rod 70, wherein the flex rod 70 includes a z-clip 72 and z-clip adjustment 74 at one end of the flex rod 70 and a flex rod anchor plate 76 at the other end. The flex rod anchor plate 76 is preferably located against the second layer 14 comprising the fiber mix and the z-clip 72 is against the existing structure 24. In another embodiment, the flex rod anchor plate 76 includes a plurality of anchor port holes 78 and corresponding anchor washers 80 to secure to the panel 10.

FIGS. 9A-9C illustrate yet another embodiment of an attachment system to secure the panel system to an existing structure or wall.

FIGS. 10A-10E illustrate yet another embodiment of an attachment system to secure the panel system to an existing structure or wall.

Figure 11A:
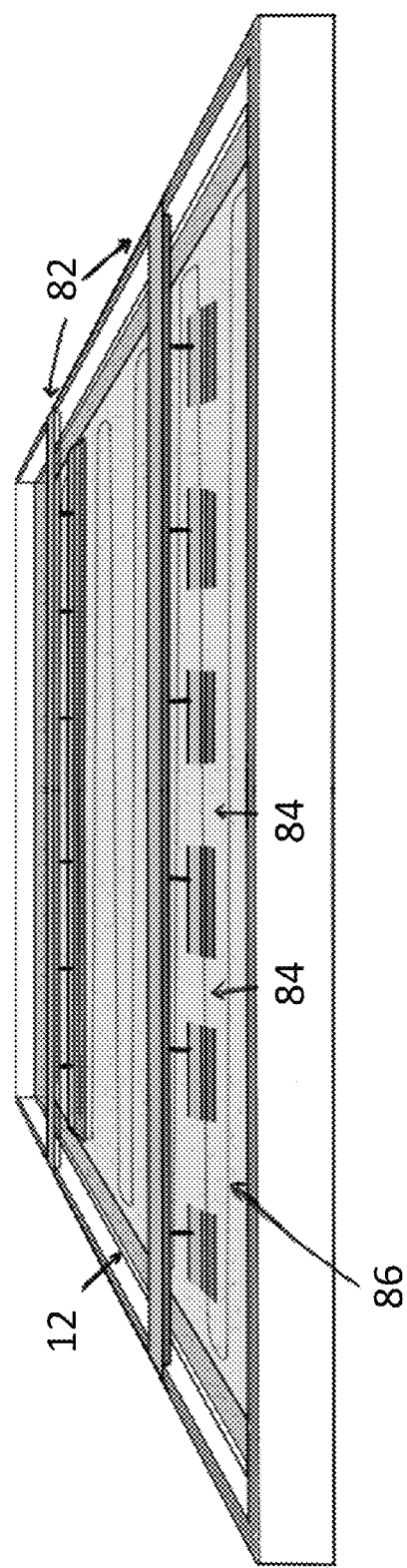

FIGS. 11A-11C illustrate various embodiments of a jig system for use with the panel system. In this embodiment, the GFRC 12 is secured within a z-channel jig 82 at several GFRC bonding points 84. Furthermore, a plurality of solar radiant tubing 86 is deployed through the jig system. In yet another embodiment a jig system is created wherein a vibrating table 88 is set up with various pump lines 90 and a two-part GFRC injection mold secured into the injection mold jigs.

FIGS. 12A-12I and FIG. 13 illustrate a rain water thermal heating and cooling system utilizing the panel system. In this embodiment, a rain screen and ventilation mat 92 is placed between a pair of panels 10. Furthermore, a plurality of solar radiant tubing 94 is situated below the ventilation mat 92 and also between the pair of panels 10.

Another view and alternate embodiment is shown in FIG. 13 of the thermal heating and cooling system, wherein a rain filtration system 96 is located at the one of each panel 10 and a plurality of solar panels 98 are placed above the rain filtration system 98 which include rain water holding and passive solar heating tanks. Furthermore, the plurality of solar radiant tubing 94 allows for the passage of rain water via rain channels 100 into corresponding rain water collection basins 102.

FIGS. 14A-14C illustrate various viewpoints of one embodiment of an individual panel 10 of the panel system. In this embodiment, a finished panel 10 is displayed with a GFRC face 104, a GFRC side lap 106 and a GFRC top lap 108.

Figure 15B:
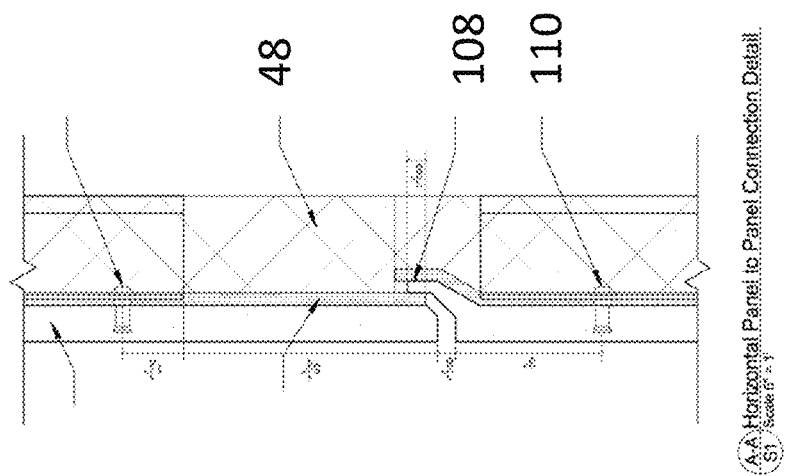
FIGS. 15A-15B illustrate various attachment and construction embodiments of a panel to an existing structure.
Figure 15A:
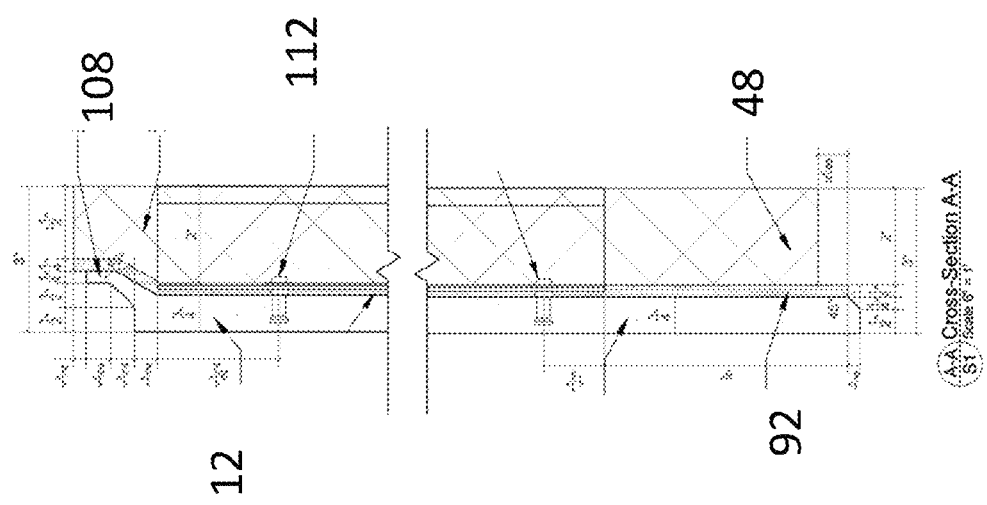

FIG. 15A illustrate a cross-sectional view of a panel 10 with the rainscreen and ventilation mat 92. In this embodiment, the GFRC 12 is situated as the outermost layer on the panel 10 and includes the top lap 108. Additionally, the mineral wool insulation 48 is located against the rain screen and ventilation mat 92. In one embodiment, the panel 10 is adhered to the rain screen and ventilation mat 92 and wool insulation 48 by a plurality of a brackets 110 that include an undercut anchor.

FIG. 15B illustrates a cross-section view of a panel 10 to panel 10 wherein multiple panels 10 may be attached to an existing structure. In this embodiment, the orientation of the top lap 108 is slightly angled thereby allowing a new panel to be placed flat against the existing structure for a smooth appearance.

Figure 16A:
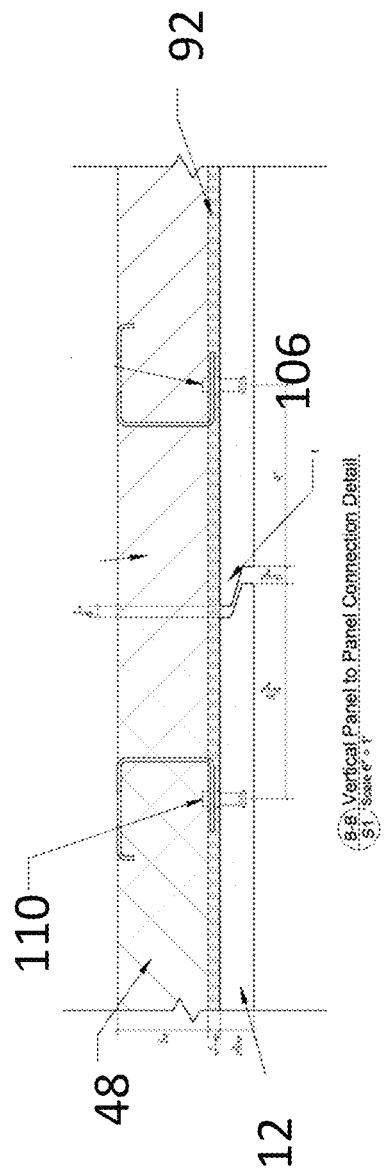
FIGS. 16A-16B illustrate a cross-sectional view of a vertical panel to panel connection.
Figure 16B:
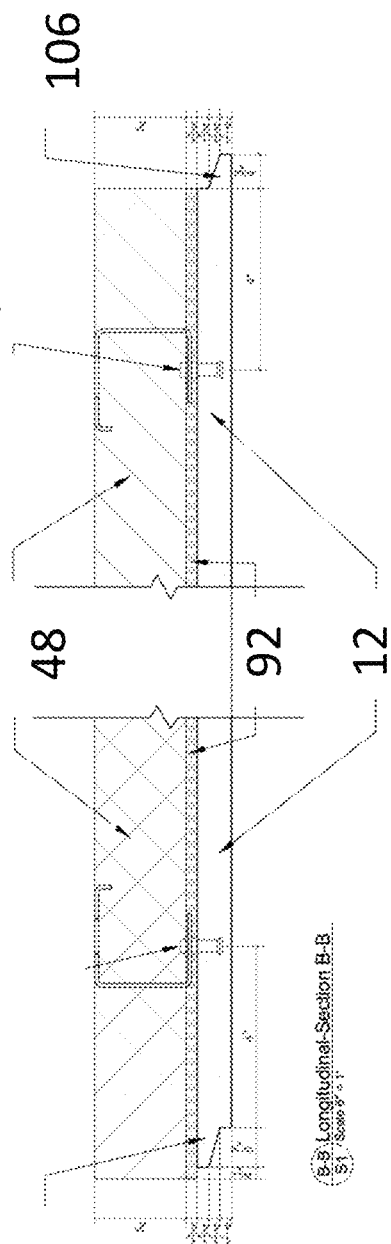

FIGS. 16A-16B illustrate a cross-sectional view of a vertical panel to panel connection. In this embodiment, the GFRC 12 is situated as the outermost layer on the panel 10 and includes the side lap 106. Additionally, the mineral wool insulation 48 is located against the rain screen and ventilation mat 92. In one embodiment, the panel 10 is adhered to the rain screen and ventilation mat 92 and wool insulation 48 by a plurality of a brackets 110 that include an undercut anchor. In this embodiment, the orientation of the side lap 106 is slightly angled thereby allowing a new panel to be placed flat against the existing structure for a smooth appearance.

FIGS. 17A-17D illustrate a variety of brackets 110 utilized to secure various components of the panel 10.

FIGS. 18A-18C illustrate a variety of clips that may be utilized with the brackets 110.

FIG. 19 illustrates a perspective view of the back of the panel 10, wherein a plurality of lateral brackets 112 and seismic brackets 114 may be utilized during panel 10 to panel 10 construction.

Figure 20C:
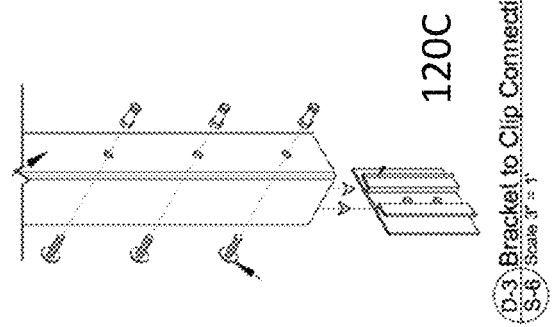
FIGS. 20A-20C illustrate various perspective views of a bracket to clip connection utilized with each panel.
Figure 20B:
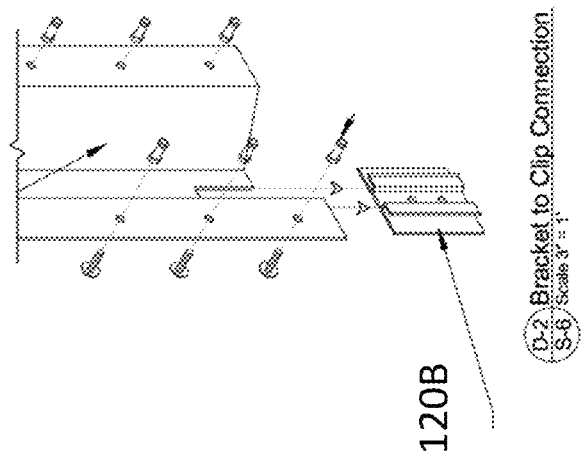
Figure 20A:
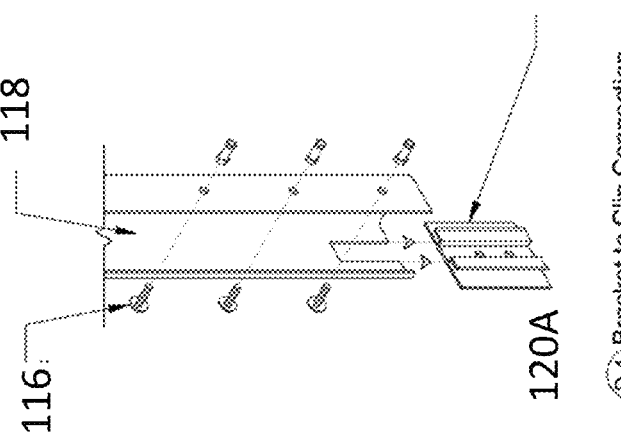

FIGS. 20A-20C illustrate various perspective views of the bracket to clip connection utilized with each panel 10. In this embodiment, an undercut anchor and nut assembly 116 is embedded in the panel 10. Furthermore, a lower panel bracket A 118, along with a first, second and third starter clips 120A, 120B, 120C are mounted on an existing structure 24 and each panel 10 is slotted onto the starter clips 120A-120C with the lower panel bracket 118.

Figure 21C:
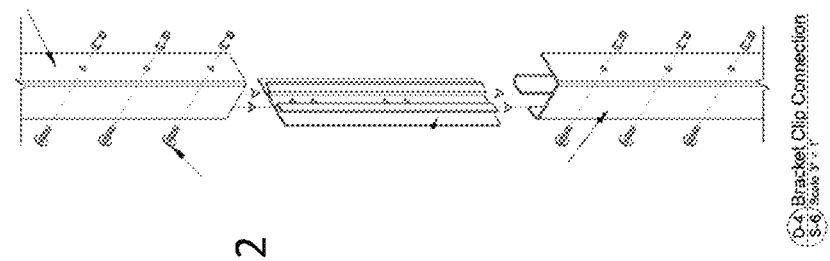
FIGS. 21A-21C illustrate additional embodiments of various bracket to clip connections for use with securing each panel to an existing structure.
Figure 21B:
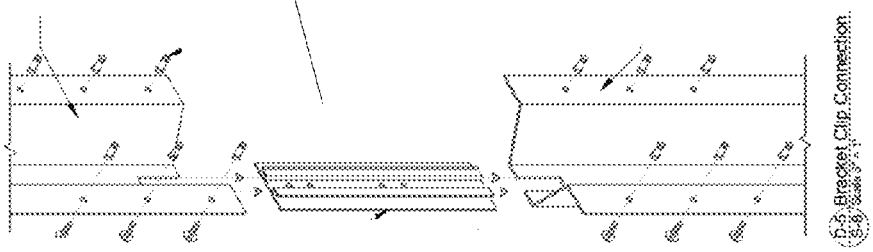
Figure 21A:
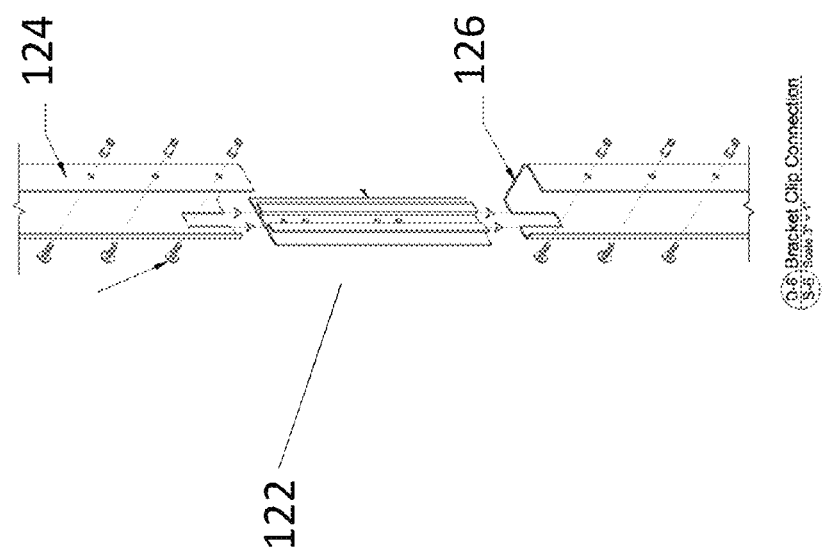

FIGS. 21A-21C illustrate additional embodiments of various bracket to clip connections for use with securing each panel 10 to an existing structure 24. In this embodiment, an interconnecting clip 122 is utilized and position above one panel 10 and below another panel 10 when securing to an existing structure 24. The interconnecting clip 122 is placed in position with a lower panel bracket A 124 from a panel 10 above the interconnecting clip 122 and fastened to the existing structure 24. In this embodiment, the lower bracket A 124 from the above panel is slotted onto the top of the interconnecting clip 122. Additionally, an upper panel bracket A 126 from the panel 10 below the interconnecting clip 122 is able to receive the interconnecting clip 122 as well.

Figure 22:
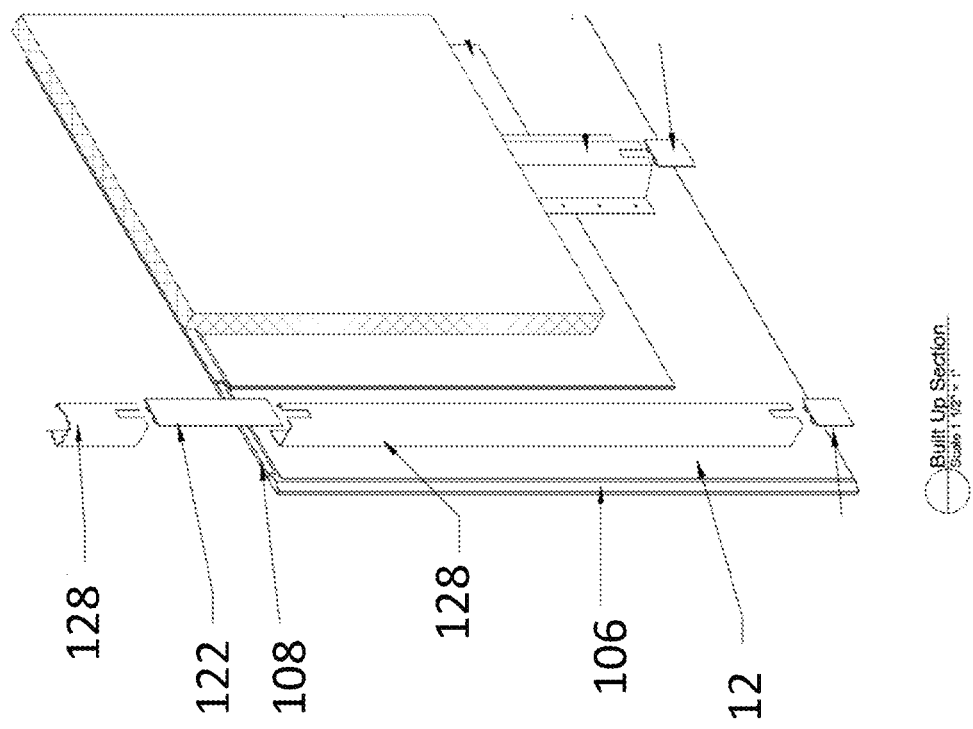
FIG. 22 illustrates a cut-away view of a built-up panel.

FIG. 22 illustrates a cut-away view of a built-up panel 10, wherein the GFRC panel 10, the GFRC side lap 106 and the GFRC top lap 108 are shown. Additionally, a panel bracket A 128 is fastened to the panel 10 with an undercut anchor; the interconnecting clip 122 is utilized to connect two panels 10 together.

Figure 23A:
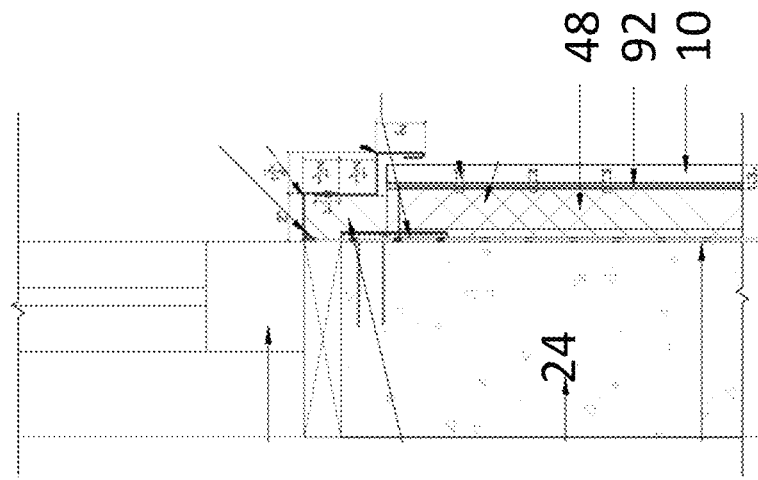
FIGS. 23A-23B illustrate cross-sectional views of a panel installation on a typical window head and a window sill
Figure 23B:
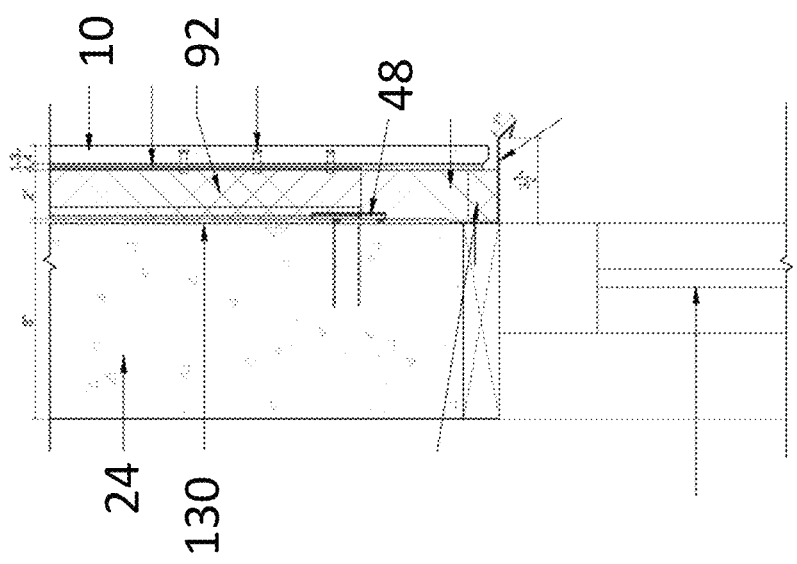

FIGS. 23A-23B illustrate cross-sectional views of a panel 10 installation on a typical window head and a window sill. In these embodiments, each panel 10 is positioned against the rainscreen & ventilation mat 92, wherein the wool insulation 48 is situated next to the ventilation mat 92. Furthermore, an air & vapor retarder 130 is located between the existing structure 24 and the wool insulation 48. This embodiment further includes an Existing Concrete Wall, a first ¾" GFRC Panel, a first 7 mm Rainscreen and Ventilation Mat, a first Air and Vapor Retarder, a first Panel Bracket A Inserted into Starter Clip, a first ½" SS Undercut Anchor embedded into GFRC, a first Starter Clip fastened to Existing Concrete Wall, a firs Loosely Packed 2" Thermafiber Mineral Wool Insulation, a first 2" Thermafiber Mineral Wool Insulation, a first New Stainless Steel Flashing, and Existing Windows.

In the embodiment of the panel system being utilized with a known in the art window sill, each panel 10 is adhered to the rain and ventilation rain mat 92, which is positioned next to the wool insulation 48. Furthermore, this set up provides for a Caulking Joint, an Existing Flashing, a New Stainless Steel Flashing Piece Pop riveted to Existing Flashing, a Finisher Clip fastened to Existing Concrete Wall, a second Loosely Packed 2" Thermafiber Mineral Wool Insulation, an Exiting Concrete Wall, a second ½" SS Undercut Anchor embedded into GFRC, a second Panel Bracket A Inserted into Finisher Clip, a second 2" Thermafiber Mineral Wool Insulation, a second 7 mm Rainscreen and Ventilation Mat, a second ¾" GFRC Panel, and an Air & Vapor Retarder.

There has thus been outlined, rather broadly, the more important features of the panel and attachment system, in order that the detailed description thereof that follows may be better understood, and in order that the present contribution to the art may be better appreciated. There are additional features of the system that will be described hereinafter and which will form the subject matter of the claims appended hereto.

What is claimed is:

1. A panel comprising:
   a first layer, wherein the first layer comprises a glass fiber reinforced concrete coating;
   a second layer, wherein the second layer comprises a plurality of glass fiber reinforced concrete coats with reinforced alkaline resistant fibers;
   a third layer, wherein the third layer comprises an alkaline resistant hurricane tested skrim mesh;
   a fourth layer, wherein the fourth layer comprises a fire resistant foam; and
   a fifth layer, wherein the fifth layer comprises an epoxy adhesive for attaching each panel to an existing structure.

2. The panel of claim 1 wherein the glass fiber reinforced concrete coating of the first layer further comprises a mixture of concrete, sand, water, glass fibers and SP 7000.

3. The panel of claim 1 wherein the first layer comprises a flame spread index of zero and a less than five smoke density.

4. The panel of claim 1, wherein the alkaline resistant hurricane tested skrim mesh of the third layer comprises a structured form of glass fiber reinforcement in which the strands are laid in vertical and horizontal parallel lines forming a grid.

5. The panel of claim 1, wherein a plurality of steel reinforcement is embedded within the fire resistant foam of the fourth layer.

6. The panel of claim 1, wherein a pair of panels may be interlocked together and then adhered via the epoxy adhesive to the existing structure.

7. The panel of claim 1, wherein the SP 7000 comprises a high-performance aqueous dispersant that is added to concrete because it reduces the water content, which leads to increased productivity.

8. A multifunctional panel and attachment system for use with an existing structure comprising:
   a plurality of panels, wherein each of the panels comprises:
      a first layer, wherein the first layer comprises a glass fiber reinforced concrete coating;
      a second layer, wherein the second layer comprises a plurality of glass fiber reinforced concrete coats with reinforced alkaline resistant fibers;
      a third layer, wherein the third layer comprises an alkaline resistant hurricane tested skrim mesh; and
      a fourth layer, wherein the fourth layer comprises a fire resistant foam;
   a z-clip attachment system, wherein the z-clip attachment system is positioned next to the fourth layer of each of the panels and further comprises:
      a horizontal support, wherein the horizontal support runs along the back of the fourth layer of each of the panels; and a pair of vertical supports, wherein the pair of vertical supports run vertically along the back of the fourth layer of each of the panels.

9. The multifunctional panel and attachment system for use with an existing structure of claim 8, wherein the z-clip attachment system further comprises:
a z rail secure clip, wherein the z rail secure clip secures each of the panels from moving side to side once secured to an existing structure; and
a plurality of z-clips, wherein the z-clips are affixed to the z-rail to secure the panels.

10. The multifunctional panel and attachment system for use with an existing structure of claim 8, further comprising:
a water/air vapor ventilation system located between the glass fiber reinforced concrete coating layer and an insulation layer to allow each of the panels to expand and contract.

11. The multifunctional panel and attachment system for use with an existing structure of claim 9, further comprising:
a water condensation ventilation mat located near the top of each of the panels;
a moisture barrier located against the insulation layer; and
a plurality of A & B fasteners with five post weight distribution located along each of the panels to secure each of the panels to an existing structure.

12. The multifunctional panel and attachment system for use with an existing structure of claim 10, wherein the first layer of each of the panels is placed against a flex rod bonding pad that includes a flex rod connected to a z-channel fastener and the flex rod bonding pad is secured against a foam/air vapor barrier against the existing structure.

13. The multifunctional panel and attachment system for use with an existing structure of claim 11, further comprising:
a z-channel connection, wherein the z-channel connection is connected to the flex rod by the z-channel fastener.

14. The multifunctional panel and attachment system for use with an existing structure of claim 11, further comprising:
a fastening rod, wherein the fastening rod further comprises a flex rod comprising:
a z-clip and a z-clip adjustment at one end of the rod; and
a flex rod anchor plate at the other end of the rod.

15. A multifunctional panel and attachment system for use with an existing structure comprising:
a plurality of panels, wherein each of the panels comprises:
a first layer, wherein the first layer comprises a glass fiber reinforced concrete coating;
a second layer, wherein the second layer comprises a plurality of glass fiber reinforced concrete coats with reinforced alkaline resistant fibers;
a third layer, wherein the third layer comprises an alkaline resistant hurricane tested skrim mesh; and
a fourth layer, wherein the fourth layer comprises a fire resistant foam;
a rainscreen and ventilation mat, wherein the rainscreen and ventilation mat is attached to each of the panels;
a wool insulation layer, wherein the wool insulation layer is located between the rainscreen and ventilation mat and an existing structure;
wherein each of the panels is attached to the rainscreen and ventilation mat and insulation layer by a plurality of brackets.

16. The multifunctional panel and attachment system for use with an existing structure of claim 15, further comprising:
a bracket to clip connection utilized with each of the panels, further comprising:
an undercut anchor and nut assembly embedded within each of the panels;
a lower panel bracket;
a first, second and third starter clip mounted on an existing structure, wherein each of the panels is mounted onto the starter clips with the lower panel bracket.

17. The multifunctional panel and attachment system for use with an existing structure of claim 15 further comprising:
an interlocking clip, wherein the interlocking clip is utilized and positioned above one of the panels and below another of the panels when securing to an existing structure.

18. The multifunctional panel and attachment system for use with an existing structure of claim 15 further comprising:
a plurality of solar radiant tubing located between the ventilation mat and two of the panels.

19. The multifunctional panel and attachment system for use with an existing structure of claim 17 further comprising:
a rain filtration system located at a top of each of the panels; and
a plurality of solar panels placed above the rain filtration system;
wherein the plurality of solar radiant tubing allows for the passage of rain water via rain channels into corresponding rain water collection basins.

* * * * *